US011708973B2

(12) United States Patent
O'Donnell

(10) Patent No.: US 11,708,973 B2
(45) Date of Patent: Jul. 25, 2023

(54) COMBUSTOR

(71) Applicant: BECKETT THERMAL SOLUTIONS, North Ridgeville, OH (US)

(72) Inventor: Michael J. O'Donnell, Avon, OH (US)

(73) Assignee: BECKETT GAS, INC., North Ridgeville, OH (US)

( * ) Notice: Subject to any disclaimer, the term of this patent is extended or adjusted under 35 U.S.C. 154(b) by 619 days.

(21) Appl. No.: 16/827,284

(22) Filed: Mar. 23, 2020

(65) Prior Publication Data

US 2020/0363065 A1 Nov. 19, 2020

Related U.S. Application Data

(60) Division of application No. 15/358,221, filed on Nov. 22, 2016, now Pat. No. 10,634,354, which is a continuation-in-part of application No. 14/238,067, filed on Feb. 10, 2014, now abandoned, and a continuation-in-part of application No. 14/238,086, filed on Feb. 10, 2014, now Pat. No. 9,528,698.

(60) Provisional application No. 61/602,261, filed on Feb. 23, 2012, provisional application No. 61/522,412, filed on Aug. 11, 2011.

(51) Int. Cl.
*F23R 3/28* (2006.01)
*F02C 3/14* (2006.01)

(52) U.S. Cl.
CPC ............... *F23R 3/286* (2013.01); *F02C 3/14* (2013.01); *Y02T 50/60* (2013.01)

(58) Field of Classification Search
CPC .. F23R 3/286; F23R 3/002; F23R 3/12; F23R 3/28; F23R 3/38; F23R 3/50; F02C 3/14; F02C 3/04; Y02T 50/60; Y02T 50/671; Y02T 50/675; F05D 2220/32; F23D 14/58; F23D 14/70; F23D 14/02; F23D 14/10; F23D 2203/1012; F23D 2900/00003; F23D 2900/14021; F23D 2203/102

See application file for complete search history.

(56) References Cited

U.S. PATENT DOCUMENTS

| 2,718,757 | A | * | 9/1955 | Bloomer | F23R 3/12 60/737 |
| 2,837,893 | A | * | 6/1958 | Schirmer | F23R 3/26 60/39.23 |
| 2,993,337 | A | * | 7/1961 | Cheeseman | F23R 3/06 60/757 |
| 4,162,140 | A | * | 7/1979 | Reed | F23D 17/00 239/405 |
| 4,519,770 | A | | 5/1985 | Kesselring et al. | |
| 4,996,838 | A | | 3/1991 | Melconian | |

(Continued)

*Primary Examiner* — Alfred Basichas
(74) *Attorney, Agent, or Firm* — Tarolli, Sundheim, Covell & Tummino LLP

(57) ABSTRACT

A fuel burner includes a tube extending from a first end to a second end and having an outer surface and an inner surface defining a central passage. The central passage is supplied at the first end with a mixture of air and combustible fuel pre-mixed upstream of the tube. The second end is closed by an end wall in a fluid-tight manner. The tube includes fluid directing structure for directing the pre-mixed mixture radially outward from the central passage to an exterior of the tube such that the pre-mixed mixture rotates radially about the central axis along the exterior of the tube.

10 Claims, 20 Drawing Sheets

(56) References Cited

U.S. PATENT DOCUMENTS

| | | | |
|---|---|---|---|
| 5,240,411 A * | 8/1993 | Abalos | F23D 14/145 431/329 |
| 8,166,763 B2 * | 5/2012 | Piper | F23R 3/286 60/737 |
| 2008/0148736 A1 | 6/2008 | Ishizaka et al. | |
| 2014/0190178 A1 | 7/2014 | O'Donnell | |
| 2014/0338339 A1 | 11/2014 | Westmoreland et al. | |

* cited by examiner

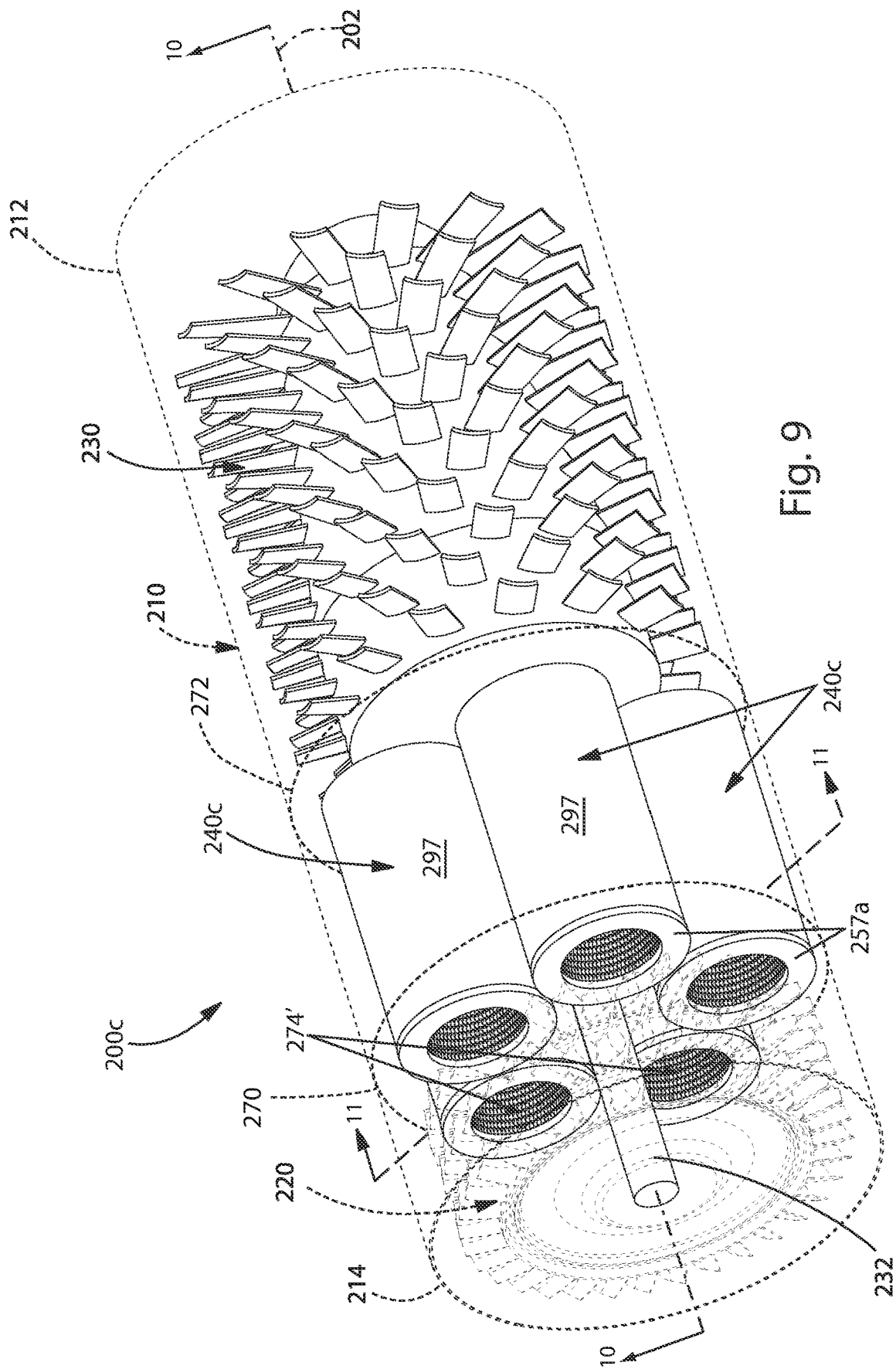

COMBUSTOR

RELATED APPLICATIONS

This application is a divisional application of U.S. Ser. No. 15/358,221, filed Nov. 22, 2016, which claims priority to U.S. application Ser. No. 14/238,067, filed Feb. 10, 2014, U.S. application Ser. No. 14/238,086, filed Aug. 10, 2012, and U.S. Provisional Application Nos. 61/602,261, filed Feb. 23, 2012, and 61/522,412, filed Aug. 11, 2011, the entirety of which are incorporated herein by reference.

TECHNICAL FIELD

The invention relates to a fuel burner and, in particular, relates to a combustor for a heating appliance or gas turbine engine that imparts a centrifugal force upon combustion air or a combination of air and fuel.

BACKGROUND

Gas turbines, also referred to as jet engines, are rotary engines that extract energy from a flow of combustion gas. They have an upstream compressor coupled to a downstream turbine with a combustion chamber in between. There are many different variations of gas turbines, but they all use the same basic principal.

Jet aircraft are usually powered by turbojet or turbofan engines. A turbojet engine is a gas turbine engine that works by compressing air with an inlet and a compressor, mixing fuel with the compressed air, burning the mixture in the combustor, and then passing the hot, high pressure gas through a turbine and a nozzle. The compressor is powered by the turbine, which extracts energy from the expanding gas passing through it. The engine converts energy in the fuel to kinetic energy in the exhaust, producing thrust. All the air ingested by the inlet passes through the compressor, combustor, and turbine.

A turbofan engine is very similar to a turbojet except that it also contains a fan at the front of the compressor section. Like the compressor, the fan is also powered by the turbine section of the engine. Unlike the turbojet, some of the flow accelerated by the fan bypasses the combustor and is exhausted through a nozzle. The bypassed flow is at a lower velocity, but a higher mass, making thrust produced by the fan more efficient than thrust produced by the core. Turbofans are generally more efficient than turbojets at subsonic speeds, but they have a larger frontal area which generates more drag at higher speeds.

Turboprop engines are jet engine derivatives that extract work from the hot-exhaust jet to turn a rotating shaft, which is then used to spin a propeller to produce additional thrust. Turboprops generally have better performance than turbojets or turbofans at low speeds where propeller efficiency is high, but become increasingly noisy and inefficient at high speeds.

Turboshaft engines are very similar to turboprops, differing in that nearly all of the energy in the exhaust is extracted to spin the rotating shaft. Turboshaft engines are used for stationary power generating plants as well as other applications.

One problem associated with gas turbine engines, especially in aircraft, is the possibility of flame-out, which occurs when the flame becomes extinguished within the combustion chamber. One of the causes of flame-out is instability of the flame front within the combustor. Since engine failure during flight is clearly problematic, it would be advantageous to construct a gas turbine engine such that the possibility of flame-out was reduced. For stationary power generating systems there is a need for reduced emissions, primarily NOx, in order to meet newer, more stringent clean air requirements.

Additionally, power burners of various types have been in use for many years. "Nozzle mix" or "gun style" burners are those burners that inject fuel and air separately in some manner so as to provide a stable flame without a ported flame holder component. Other types of power burners use some method of pre-mixing the fuel and air and then delivering the fuel-air mixture to a ported burner "head". These "heads" or "cans" can be made of a variety of materials including perforated sheet metal, woven metal wire, woven ceramic fiber, etc. Flame stability, also referred to as flame retention, is key to making a burner that has a broad operating range and is capable of running at high primary aeration levels. A broad operating range is desired for appliances that benefit from modulation, in which the heat output varies depending on demand. High levels of primary aeration are effective in reducing $NO_x$ emissions, but tend to negatively impact flame stability and potentially increase the production of Carbon Monoxide (CO). High levels of primary aeration (also referred to as excess air) also reduce appliance efficiency. There is a need in the art for a fuel burner that reduces the production of $NO_x$ while maintaining flame stability. Even more desirable is a burner that produces very low levels of $NO_x$ while operating at low levels of excess air.

SUMMARY OF THE INVENTION

The present invention provides a new and improved method of combustion and a combustor or burner that can be used in a jet engine, as well as other heating/burner applications such as a heating appliance or gas turbine engine.

In accordance with an aspect of the invention, a fuel burner includes a tube extending from a first end to a second end and having an outer surface and an inner surface defining a central passage. The central passage is supplied at the first end with a mixture of air and combustible fuel pre-mixed upstream of the tube. The second end is closed by an end wall in a fluid-tight manner. The tube includes fluid directing structure for directing the pre-mixed mixture radially outward from the central passage to an exterior of the tube such that the pre-mixed mixture rotates radially about the central axis along the exterior of the tube.

In accordance with another aspect of the invention a fuel burner includes an outer tube extending along a central axis from a first end to a second end. The outer tube includes an outer surface and an inner surface defining a passage. The outer tube includes fluid directing structure having a plurality of openings and a guide associated with each opening. An inner tube extends from a first end to a second end and is positioned within the passage of the outer tube. The inner tube includes an outer surface and an inner surface defining a central passage. A fluid passage is defined between the outer surface of the inner tube and the inner surface of the outer tube. The central passage is supplied with a mixture of air and combustible fuel pre-mixed upstream of the inner tube. The inner tube has fluid directing structure for directing the pre-mixed mixture radially outward from the central passage to the fluid passage such that the pre-mixed mixture rotates radially about the central within the fluid passage. The fluid directing structure on the outer tube is supplied with the pre-mixed mixture and directs the pre-mixed mixture radially inward to the fluid passage to mix with the pre-mixed mixture from the fluid directing structure on the inner tube. A first end wall closes the second end of the inner tube in a fluid-tight manner. A second end wall secures the first end of the inner tube to the outer tube in a fluid-tight manner such that the fluid directing structure on the inner tube provides the only fluid path from the central passage to the fluid passage.

In accordance with another aspect of the invention, a jet engine includes a housing having a first end and a second end and an interior passage that extends from the first end to the second end. A compressor is positioned within the first end of the interior passage and a turbine is positioned within the second end of the interior passage. A combustor is positioned within the interior passage between the compressor and the turbine. The combustor extends along a central axis and includes an outer tube having an outer surface and an inner surface defining a passage. An inner tube positioned within the passage of the outer tube has an outer surface and an inner surface defining an interior. A fluid passage is defined between the outer surface of the inner tube and the inner surface of the outer tube. The fluid passage is supplied with a mixture of air and combustible fuel. The inner tube and the outer tube have fluid directing structure for causing the mixture of air and combustible fuel within the fluid passage to rotate radially about the central axis.

In accordance with another aspect of the invention, a combustor for a jet engine having a compressor portion and a turbine portion includes an outer tube having a central axis. The outer tube extends longitudinally and is positioned to receive air discharged by the compressor portion. The outer tube has an outer surface and an inner surface. An inner tube is positioned within the outer tube. The inner tube has an outer surface spaced from the inner surface of the outer tube, thereby defining a combustion chamber passage therebetween. The outer tube includes fluid directing structure for communicating at least some of the air discharged by the compressor portion into the combustion chamber passage. The air is directed in a direction offset from the central axis, thereby causing rotation of the air about the central axis. At least one fuel supply member supplies a fuel to the combustion chamber passage in order to form a rotating fuel air mixture in the combustion chamber passage.

In accordance with another aspect of the invention, a combustor for a jet engine having a compressor portion and a turbine portion includes a tube having a central axis. The tube is located intermediate the compressor portion and the turbine portion and includes an outer surface and an inner surface. Fluid directing structure formed on the tube includes passages extending from the outer surface to the inner surface. The inner surface of the tube defines a combustion chamber. A passage communicates air discharged by the compressor portion with the outer surface of the tube for delivering compressor air to the combustion chamber through the fluid directing structure. The fluid directing structure directs the compressor air at an angle offset from the central axis, thereby causing rotation of the compressor air in the combustion chamber. A fuel supply member supplies fuel to the combustion chamber.

In accordance with another aspect of the invention, a method for combusting fuel in a jet engine having compressor and turbine portions includes providing a tube having an outer surface communicating with air discharged by the compressor portion and an inner surface at least partially defining a combustion chamber. Fluid directing structure is provided between the inner and outer surfaces for communicating the compressor air from the outer surface to the combustion chamber, at an angle offset with respect to a central axis of the tube, such that the air is caused to rotate within the combustion chamber. Fuel is supplied to the combustion chamber to thereby provide a swirling fuel/air mixture. The fuel air mixture is at least partially combusted in the combustion chamber. The combusted fuel/air mixture is supplied to the turbine portion.

Additional features and a further understanding of the invention will become apparent by reading the following detailed description made in connection with the accompanying drawings.

BRIEF DESCRIPTION OF THE DRAWINGS

FIG. 9 is a schematic illustration of an alternative combustor for use in a jet engine in accordance with another aspect of the present invention;

DETAILED DESCRIPTION

The invention relates to a fuel burner and, in particular, relates to a combustor for a heating appliance, gas turbine engine or jet engine that imparts a centrifugal force upon combustion air or a combination of air and fuel. Although some drawings generally depict a turbojet type engine and the specification describes an example use of the present invention in a jet engine, those having ordinary skill will appreciate that the combustor of the present invention described herein is also suitable for use in any of the engine variants described above.

Figure 1:
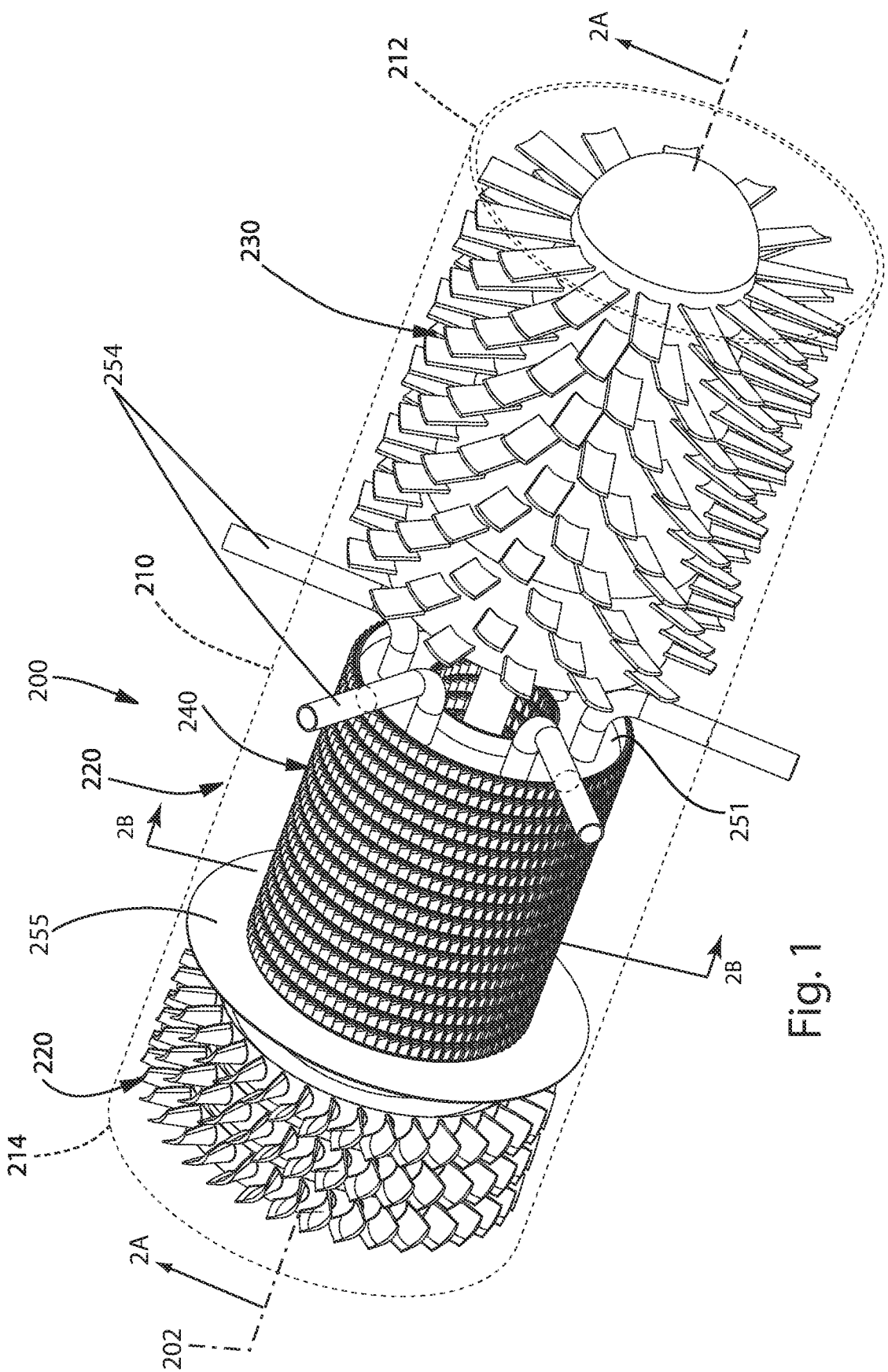
FIG. 1 is a schematic illustration of a combustor for use in a jet engine in accordance with an aspect of the present invention.
Figure 2A:
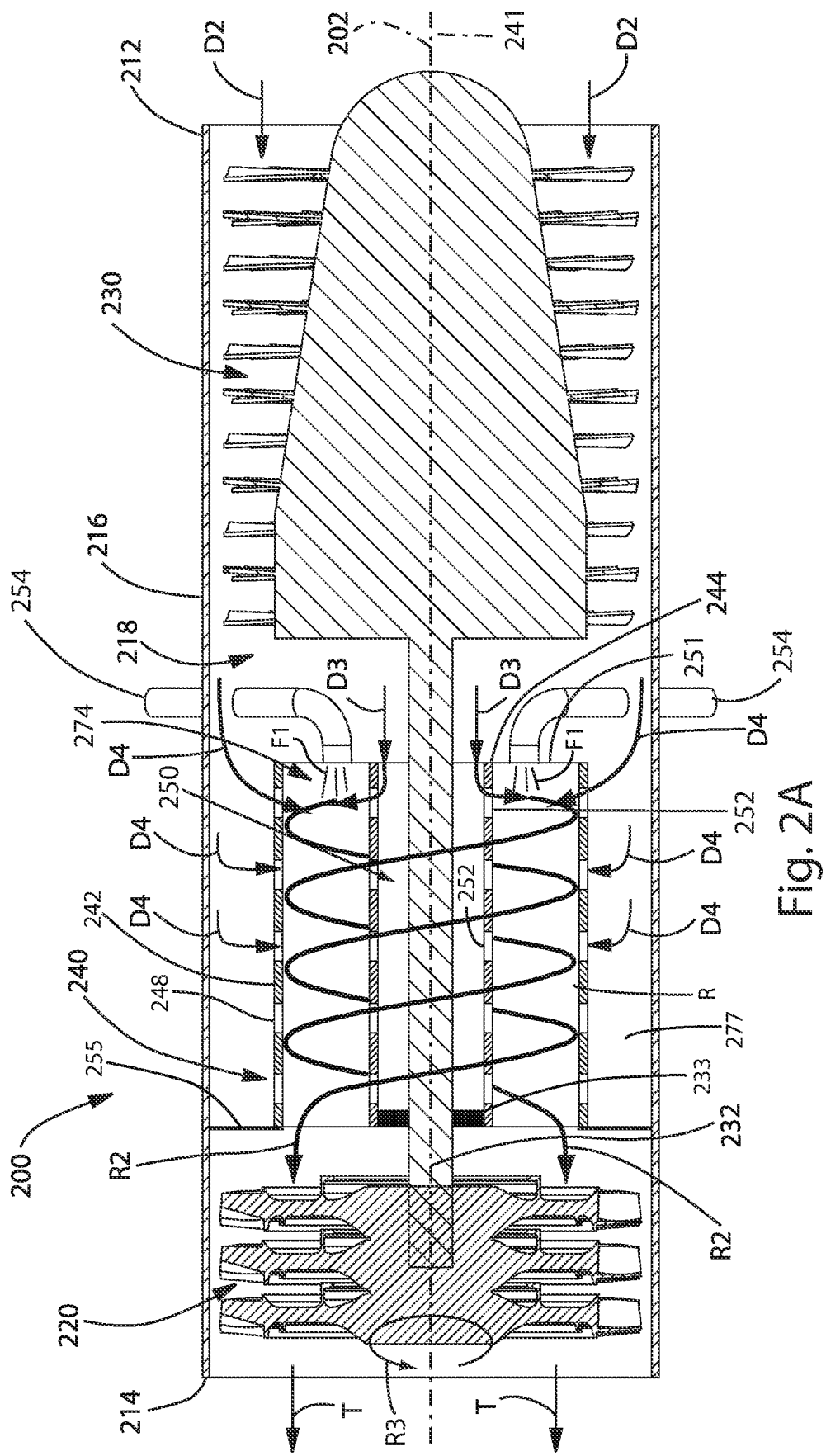
FIG. 2A is a section view taken along line 2A-2A of FIG. 1.
Figure 2B:
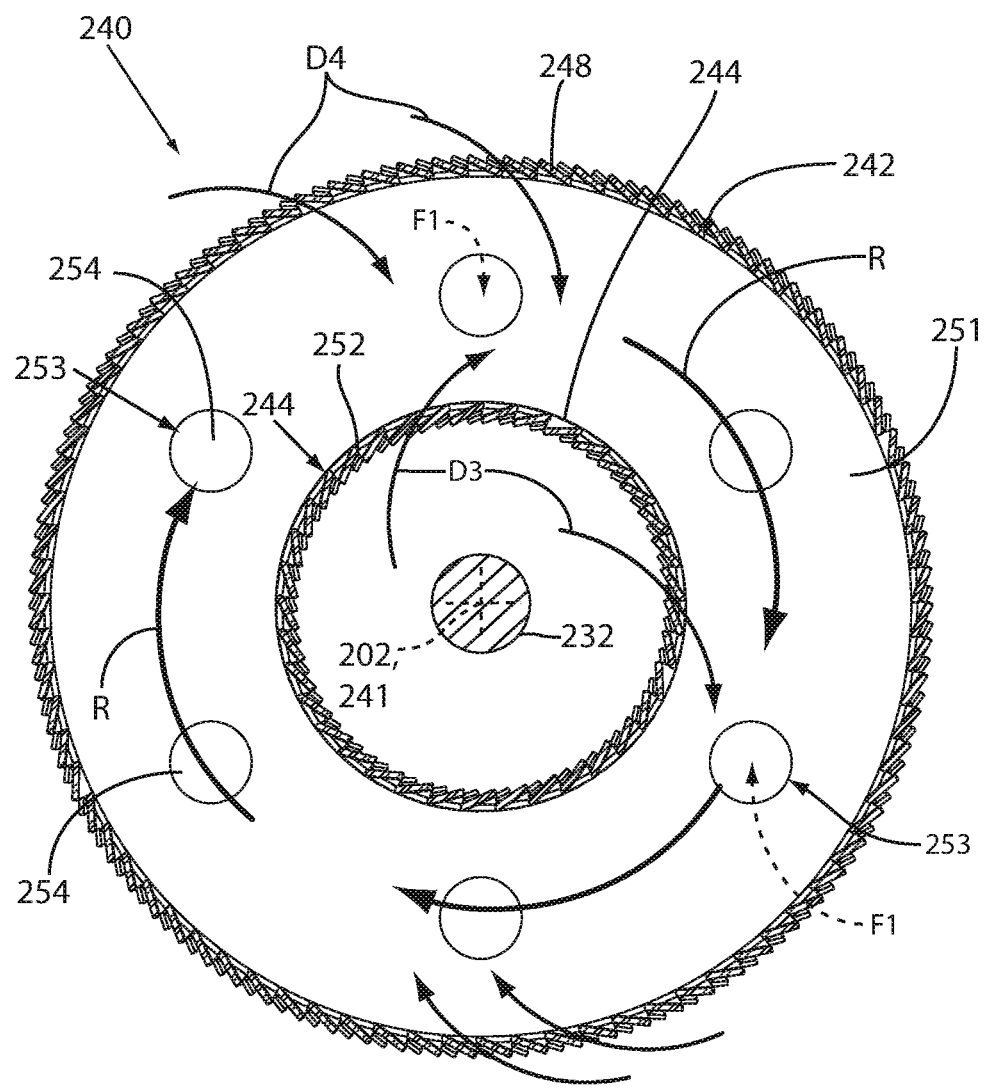
FIG. 2B is a section view taken along line 2B-2B of FIG. 1.

FIGS. 1-2B illustrate a combustor 240 for use in a jet engine 200 in accordance with an embodiment of the present invention. As shown in FIG. 1, the jet engine 200 extends along an axis 202 and includes a housing 210 that extends along the axis from a first end 212 to a second end 214. A wall 216 of the housing 210 defines an interior passage 218 that extends the length of the housing. A turbine 220, a compressor 230, and at least one combustor 240 are positioned within the passage 218 of the housing 210 and along the axis 202. The compressor 230 includes a shaft or connecting member 232 that connects the compressor to the turbine 220 such that the connecting member and turbine rotate together. The combustor 240 is positioned axially between the turbine 220 and the compressor 230.

As shown in FIGS. 2A-2B, the combustor 240 includes outer and inner tubes 242, 244 that are concentric to one another about a central axis 241 and secured to one another and the housing 210. The central axis 241 of the combustor 240 can be coaxial with the axis 202 of the engine 202 or can be spaced from the axis of the engine (not shown). The connecting member 232 extends through the inner tube 244 and a shaft seal 233 is provided between the connecting member and the inner tube to prevent fluid from passing between the connecting member and the inner tube directly into the turbine 220.

The space between the outer and inner tubes 242, 244 defines a fluid passage 274 for receiving fuel and air. The periphery of the outer tube 242 includes fluid directing structure 248 for directing fluid radially inward to the fluid passage 274. More specifically, the fluid directing structure 248 is configured to direct fluid to the fluid passage 274 in a direction that is offset from the central axis 241 of the combustor 240 and along a path that is angled relative to the normal of the inner surface (not shown) of the outer tube 242.

The periphery of the inner tube 244 includes fluid directing structure 252 for directing fluid from the interior 250 of the inner tube radially outward into the fluid passage 274. More specifically, the fluid directing structure 252 is configured to direct fluid into the fluid passage 274 in a direction that is offset from the central axis 241 of the combustor 240 and along a path that is angled relative to the normal of the outer surface (not shown) of the inner tube 244. The fluid directing structures 248, 252 can direct their respective fluid in the same general direction. The fluid directing structure 248, 252 can include a series of openings with associated fins or guides for directing the fluid in the desired manner (FIGS. 3A-4D).

The jet engine 200 further includes one or more tubular fuel supply members 254 that extend into or are otherwise in direct fluid communication with the fluid passage 274 of the combustor 240 and extend radially outward from the passage, through the wall 216 of the housing 210, and to a fuel source (not shown) outside of the housing. The fuel supply members 254 thereby deliver fuel directly to the fluid passage 274, as indicated generally by arrows F1. Although six fuel supply members 254 spaced radially equidistant from one another are illustrated in FIGS. 1-2B, it will be appreciated that any number of fuel supply members exhibiting any spacing configuration can be provided in accordance with the present invention.

A ring-shaped wall 251 (see FIG. 2B) is secured to the end of the outer and inner tubes 242, 244 closer to the compressor 230 in order to seal one end of the fluid passage 274 in a fluid-tight manner. The wall 251 is provided with openings 253 that receive ends of the fuel supply members 254 to establish the direct fluid path between the fuel supply members and the fluid passage 274.

In operation, air enters the compressor 230 at the first end 212 of the housing 210 in the direction indicated generally by the arrows D2 (FIG. 2A) and exits the compressor as compressed air. Some of the compressed air exiting the compressor 230 flows directly into the interior 250 of the inner tube 244 as indicated generally by the arrows D3 and through the fluid directing structure 252 in the inner tube 244 into the fluid passage 274. Some of the compressed air also flows to the peripheral annular space 277 between the outer tube 242 and the wall 216 of the housing 212, where it flows through the fluid directing structure 248 in the outer tube and into the fluid passage 274 as indicated generally by arrows D4. A wall 255 secured to the end of the outer and inner tubes 242, 244 closer to the turbine 220 and between the outer tube and the wall 216 of the housing 210 prevents the compressed air D4 from passing into the turbine without first passing through the combustor 240.

The compressed air D3, D4 is mixed with fuel F1 that is injected into the combustor 240 via the fuel supply members 254. Since the ring-shaped wall 251 blocks the end of the fluid passage 274 adjacent to the compressor 230, the fuel F1 is directed by the fuel supply members 254 directly into the fluid passage 274. Accordingly, the fluid directing structures 248, 252 of the combustor 240 only control the flow of compressed air D4, D3 into the fluid passage 274 such that the compressed air mixes with the fuel F1 from the fuel supply members 254 within the fluid passage 274 in a desired manner. More specifically, as the peripheral air D4 passes through the fluid directing structure 248 in the outer tube 242 and into the fluid passage 274, the air mixes with the fuel F1 exiting the fuel supply members 254. Due to the configuration of the fluid directing structure 248, the compressed air D4 is imparted with a centrifugal force about the central axis 241 of the combustor 240 as it enters the fluid passage 274. The swirling air D4 mixes with the fuel F1 to create a swirling air/fuel mixture within the fluid passage 274 and about the central axis 241 of the combustor 240.

Likewise, the compressed air D3 enters the interior 250 of the inner tube 244 and passes through the fuel directing structure 252 of the inner tube 244 and into the fluid passage 274, thereby imparting a centrifugal force upon the compressed air D3 about the central axis 241 of the combustor 240. The swirling air D3 mixes with the fuel F1 to create an additional swirling air/fuel mixture within the fluid passage 274 and about the central axis 241 of the combustor 240. The mixture formed from the fuel F1 and the compressed air D3 mixes with and becomes indistinguishable from the mixture formed from the fuel F1 and the compressed air D4 within the fluid passage 274.

Since the fluid directing structures 248, 252 extend around the entire periphery of the outer tube 242 and the inner tube 244, respectively, the collective air/fuel mixture within the fluid passage 274 is forced generally in a single direction, indicated by arrow R (FIG. 2B), that is transverse to the central axis 241 of the combustor 240. It will be appreciated that the fluid directing structures 248, 252 can direct the respective air/fuel mixtures in the same direction, e.g., clockwise relative to the central axis 241, within the fluid passage 274. Consequently, the air/fuel mixture within the fluid passage 274 undergoes a rotational, spiraling effect relative to the central axis 241 of the combustor 240 and within the fluid passage 274. The rotating, spiraling air/fuel mixture is ignited by an ignition device (not shown) of any number of types well known in the art and positioned in any number of suitable locations to light the combustor 240. For example, the wall 251 can be provided with an opening (not shown) through which an igniter extends. Flame proving means (not shown) can be positioned in any number of suitable locations to detect the presence of flame.

Due to the continued supply of air and fuel to the combustor 240 from the compressor 230 and the fuel supply members 254, subsequent spiraling air/fuel mixtures are created within the fluid passage 274 prior to complete combustion of prior air/fuel mixtures within the passage such that the spiraling air/fuel mixtures become radially layered within the fluid passage. The swirling or rotation of the air fuel mixture in the passage 274 provides thorough mixing of the fuel and air, thereby improving combustion.

The swirling pattern imparted to the fuel air mixture contributes to combustion stability and, therefore, reduces the chances of flame out.

As shown in FIGS. 2A-2B, the combustion products from the ignited air/fuel mixture exit the combustor 240 rotating about the central axis 241 of the combustor 240 and the axis 202 of the jet engine 200 as indicated generally by arrows R2. The combustion products of the air/fuel mixture exit the combustor 240 at elevated pressure and velocity and pass through the turbine 220, thereby imparting rotation upon the turbine as indicated generally by arrow R3. The turbine 220, in turn, directs the combustion products out of the jet engine 200 in the direction indicated generally by arrows T to provide thrust to the aircraft. Since the connecting member 232 rotatably connects the turbine 220 to the compressor 230, the rotating turbine drives the compressor.

Figure 3A:
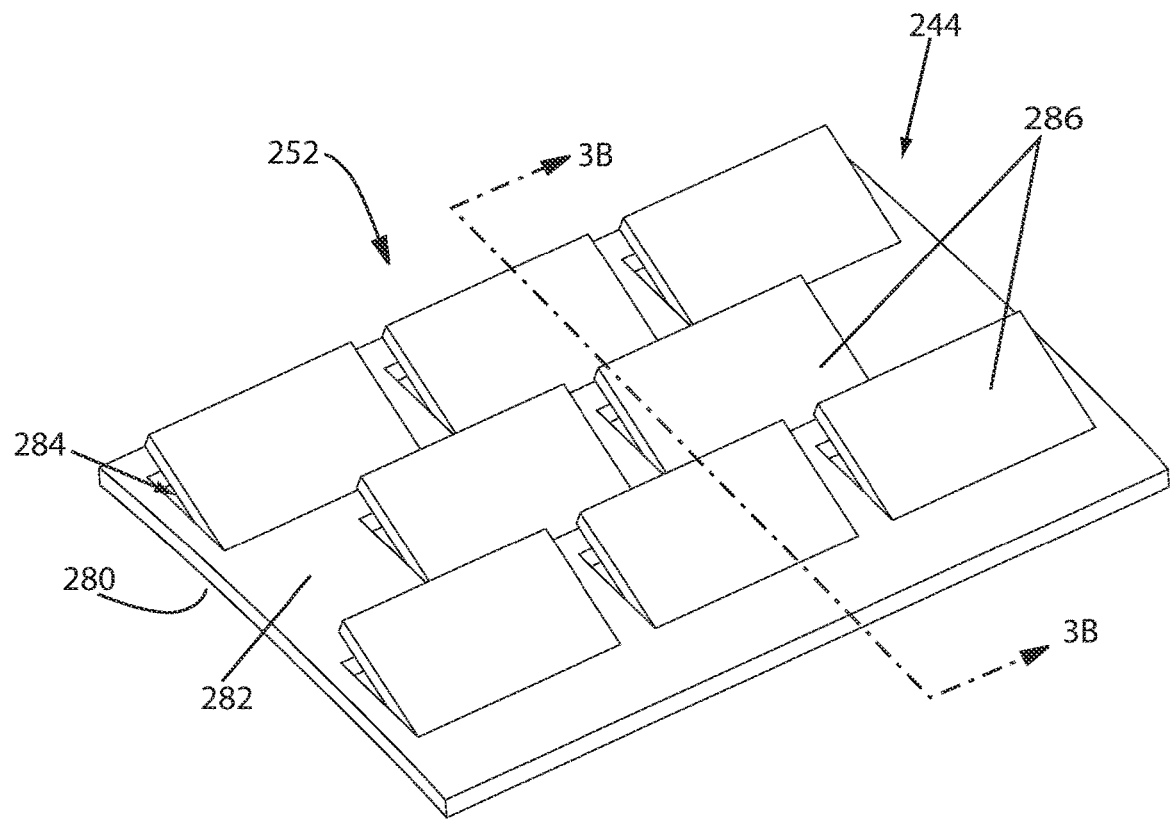
FIG. 3A is an enlarged view of a portion of a fluid directing structure constructed in accordance with a preferred embodiment of the invention.
Figure 3B:
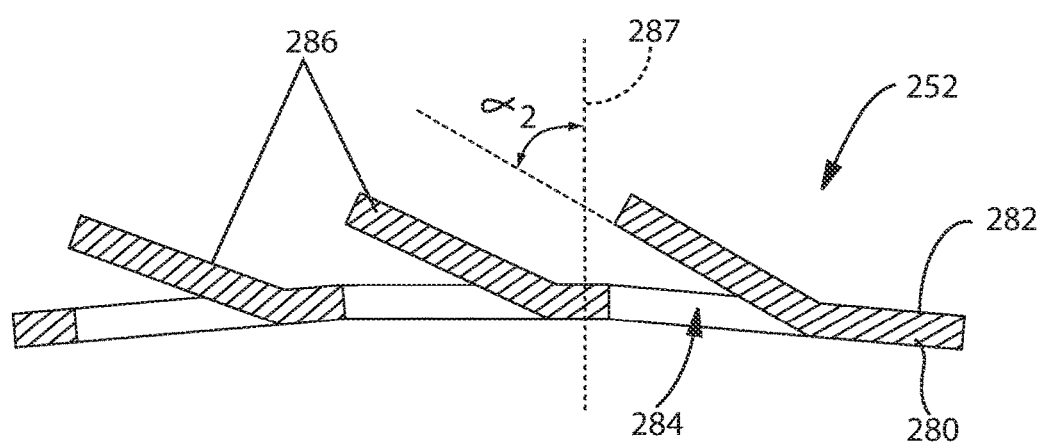
FIG. 3B is a section view of FIG. 3A taken along line 3B-3B.

Each of the fluid directing structures 248, 252 can have any configuration suitable for imparting rotation to the compressed air D4, D3, respectively, to form an air/fuel mixture with the fuel F1 and within the fluid passage 274 that swirls about the central axis 241 of the combustor 240 in accordance with the present invention. FIGS. 3A-3B illustrate one configuration of the fluid directing structure 252 of the inner tube 244 and those having ordinary skill will appreciate that the fluid directing structure 248 of the outer tube 242 can have a similar construction to the fluid directing structure 252. Alternatively, the fluid directing structures 248 and 252 can be dissimilar (not shown). In any case, the fluid directing structure 248 is configured to direct fluid radially inward while the fluid directing structure 252 is configured to direct fluid radially outward.

As shown in FIGS. 3A-B, the fluid directing structure 252 includes a plurality of openings 284 in the inner tube 244 for allowing the compressed air D3 to pass radially outward from the central passage 250 of the inner tube to the fluid passage 274. Each of the openings 284 extends entirely through the inner tube 244 from an inner surface 282 to an outer surface 280. Each opening 284 can have any shape, such as rectangular, square, circular, triangular, etc. The openings 284 can all have the same shape or different shapes. The openings 284 are aligned with one another along the periphery, i.e., around the circumference, of the inner tube 244 to form an endless loop. One or more endless loops of openings 284 can be positioned adjacent to one another or spaced from one another along the length of the inner tube 244. Each loop can have any number of openings 284. The openings 284 in adjacent loops can be aligned with one another or can be offset from one another. The size, shape, configuration, and alignment of the openings 284 in the inner tube 244 is dictated by desired flow and performance characteristics of the compressed air D3 flowing through the openings. Although the openings 284 are illustrated as being arranged in a predetermined pattern along the inner tube 244, it will be appreciated that the openings can be randomly positioned along the inner tube (not shown).

Each opening 284 includes a corresponding fluid directing projection or guide 286 for directing the compressed air D3 passing through the associated opening radially outward into the fluid passage 274 and in a direction that is offset from the central axis 241 of the combustor 240, i.e., a direction that will not intersect the central axis. The guides 286 are formed on or integrally attached to the inner surface 282 and/or the outer surface 280 (not shown) of the inner tube 244. Each guide 286 extends at an angle (shown in FIG. 3b) relative to the outer surface 280 of the inner tube 244. The guides 286 can extend at the same angle or at different angles relative to the outer surface 280 of the inner tube 244. Each guide 286 extends at an angle, indicated at α2, relative to an axis 287 extending normal to the outer surface 280 of the inner tube 244.

Since the fluid directing structure 248 on the outer tube 242 can be formed similar to the fluid directing structure 252 on the inner tube 244, those having ordinary skill in the art will appreciate that guides and openings associated with the fluid directing structure 248 (not shown) direct the compressed air D4 passing through the outer tube radially inward toward the central passage 274 and in a direction that is offset from the central axis 241 of the combustor 240. Similar to the fluid directing structure 252 on the inner tube 244, the guides of the fluid directing structure 248 on the outer tube 242 can be formed in or integrally attached to the inner surface and/or the outer surface of the outer tube (not shown). In the illustrated embodiment, the fluid directing structures 248, 252 direct the associated incoming compressed air D4, D3 in the same general direction such that the combined air/fuel mixture swirls within the fluid passage 274 around the central axis 241 of the combustor 240 in the same general direction.

FIGS. 4A-D illustrate alternative configurations of the fluid directing structure 252 in the inner tube 244 in accordance with the present invention. The fluid directing structure 252a-d directs the incoming compressed air D3 radially outward into the fluid passage 274 and in a direction that is 1) offset from the central axis 241 and 2) angled relative to the normal of the outer surface 280 of the inner tube 244 such that compressed air mixes with the fuel F1 to form an air/fuel mixture within the central passage 274 that exhibits a swirling, rotational path around the central axis while becoming radially layered relative to the central axis. The openings in the fluid directing structure can be randomly positioned along the inner tube 244 or can be arranged in any predetermined pattern dictated by desired flow and performance criterion.

FIGS. 4A-D illustrate alternative configurations of the fluid directing structure 252, 248 that can be formed on or integrally attached to the inner and/or outer surface of the respective tube 244, 242 in accordance with the present invention. More specifically, either of the fluid directing structures 248, 252 can exhibit any of the configurations shown in FIGS. 4A-D. In the preferred embodiment, the fluid directing structure 248 directs the incoming compressed air D4 radially inward into the fluid passage 274 and in a direction that is 1) offset from the central axis 241 and 2) angled relative to the normal of the inner surface of the outer tube 242 (not shown) such that the compressed air mixes with the fuel F1 to form an air/fuel mixture that exhibits a swirling, rotational path within the central passage 274 and around the central axis. Likewise, the fluid directing structure 252 directs the incoming compressed air D3 radially outward into the fluid passage 274 and in a direction that is 1) offset from the central axis 241 and 2) angled relative to the normal of the outer surface 280 of the inner tube 244 (not shown) such that compressed air mixes with the fuel F1 to form an air/fuel mixture that exhibits a swirling, rotational path within the central passage 274 and around the central axis. In each case, the openings in the fluid directing structure 248, 252 can be randomly positioned along the respective tube 242, 244 or can be arranged in any predetermined pattern dictated by desired flow and performance criterion.

Figure 4A:
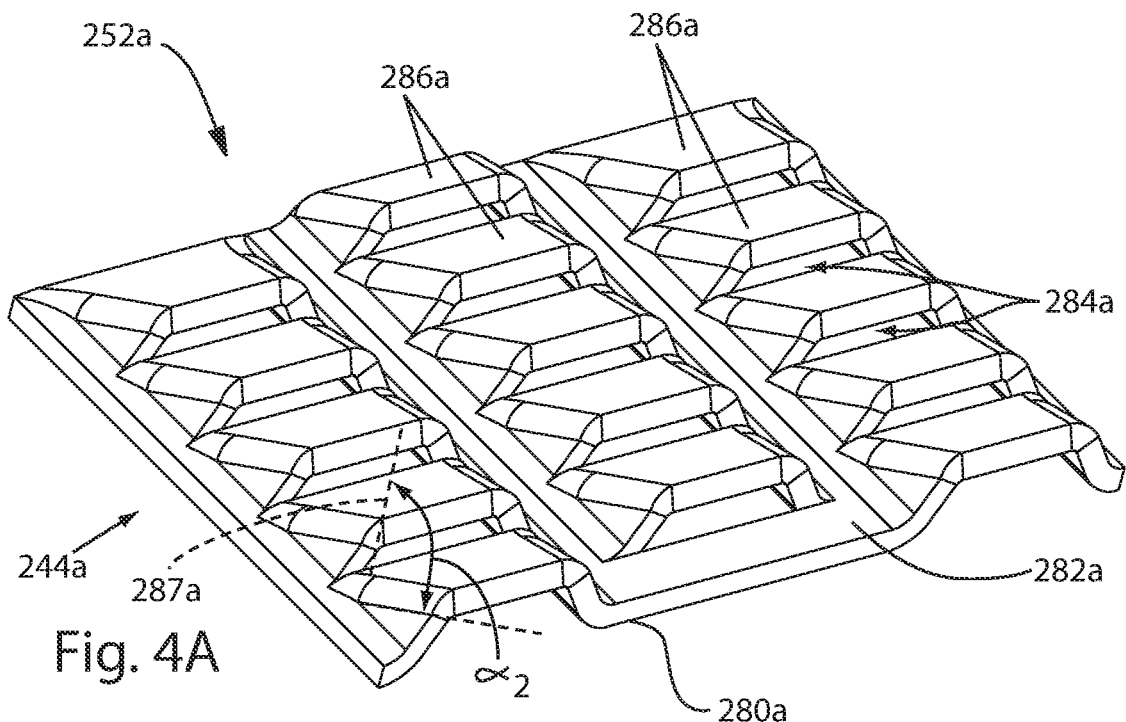
FIGS. 4A-4D are enlarged views of portions of alternative fluid directing structure in accordance with the present invention.

In FIG. 4A, the fluid directing structure 252a includes a plurality of guides 286a that define openings 284a in the inner tube 244a. The guides 286a are arranged in a series of rows that extend around the periphery of the inner tube 244a. The annular rows are positioned next to one another along the length of the inner tube 244a. The guides 286a of adjacent rows can be radially offset from one another or can be radially aligned with one another (not shown). The guides 286a in each row can be similar or dissimilar to one another. The guides 286a direct the compressed air D3 passing through the openings 284a in a radially inward direction that is offset from the central axis 241 and at an angle α2 relative to the axis 287a extending normal to the outer surface 280a of the inner tube 244a. If the guides 286a within a row are fully or partially aligned with one another around the periphery of the inner tube 244a, the compressed air D3 exiting each guide in that row is further guided in a direction offset from the central axis 241 by the adjacent guide(s) in the same row.

Figure 4B:
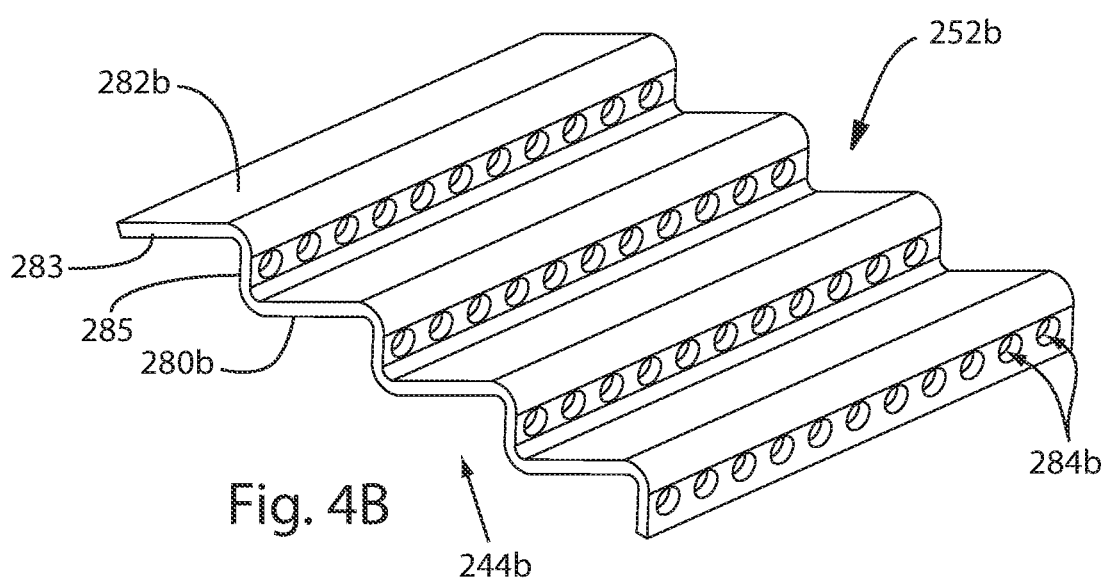

In FIG. 4B, the inner tube 244b is formed as a series of steps that each includes a first member 283 and a second member 285 that extends substantially perpendicular to the first member to form an L-shaped step. The second member 285 of each step includes a plurality of openings 284b for directing the compressed air D3 in a direction that is offset from the central axis 241 and angled relative to the axis (not shown) extending normal to the outer surface 280b of the inner tube 244b. In particular, the openings 284b in each second member 285 direct the compressed air D3 across the first member 283 of the adjoining step to impart rotation to the compressed air and, thus, to the air/fuel mixture within the fluid passage 274 about the central axis 241.

Figure 4C:
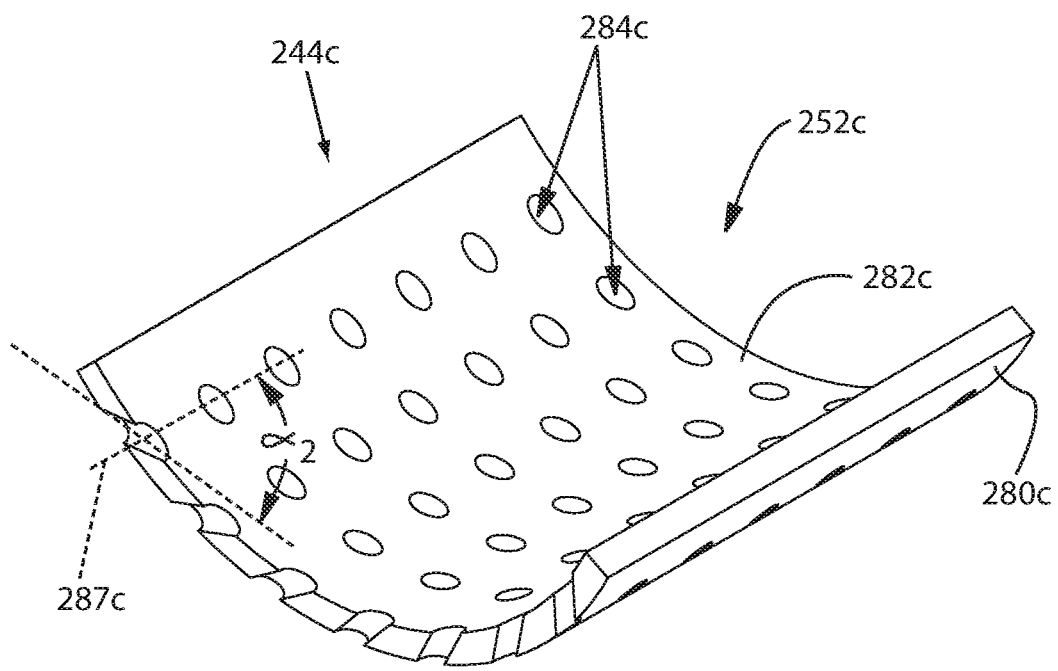

In FIG. 4C, the fluid directing structure 252c includes a plurality of openings 284c that extend from the inner surface 282c of the inner tube 244c to the outer surface 280c. The openings 284c extend through the inner tube 244c at an angle relative to the axis 287c extending normal to the outer surface 280c of the inner tube 244c and through the central axis 241 of the combustor 240. The openings 284c in the inner tube 244c direct the compressed air D3 and, thus, the air/fuel mixture within the fluid passage 274 in a direction that is offset from the central axis 241 and at an angle relative to the axis 287c in order to impart rotation to the air/fuel mixture within the fluid passage about the central axis.

Figure 4D:
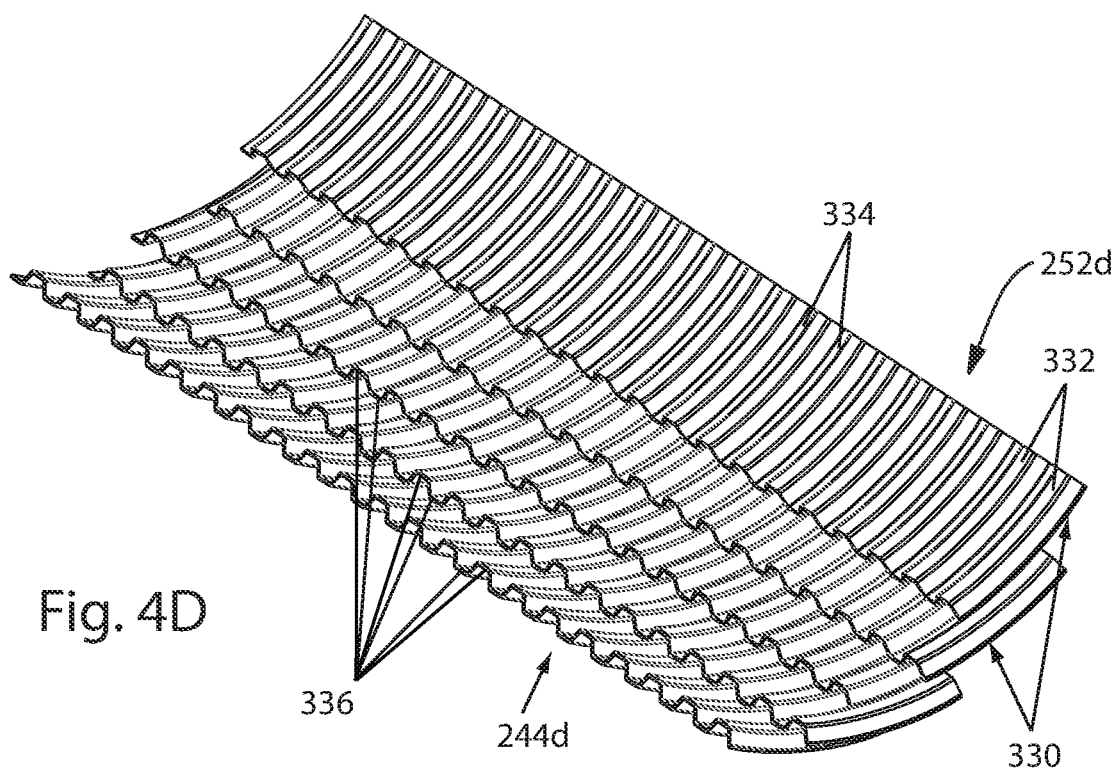

In FIG. 4D, the fluid directing structure 252d is formed by a series of arcuate, overlapping plates 330 that cooperate to form the inner tube 244d. Each plate 330 has a corrugated profile that includes peaks 332 and valleys 334. The plates 330 are longitudinally and radially offset from one another such that that peaks 332 of one plate 330 are spaced between the peaks of adjacent plates. In this configuration, the peaks 332 and valleys 334 of the plates create passages 336 through which the compressed air D3 is directed. Each plate 330 directs the compressed air D3 in a direction that extends substantially parallel to the adjoining arcuate plate to impart rotation to the compressed air and, thus, to the air/fuel mixture within the fluid passage 274 about the central axis 241. The air/fuel mixture within the fluid passage 274 is thereby directed in a direction that is offset from the central axis 241 of the combustor 240 and angled relative to the axis (not shown) extending normal to the plates 330.

Figure 5:
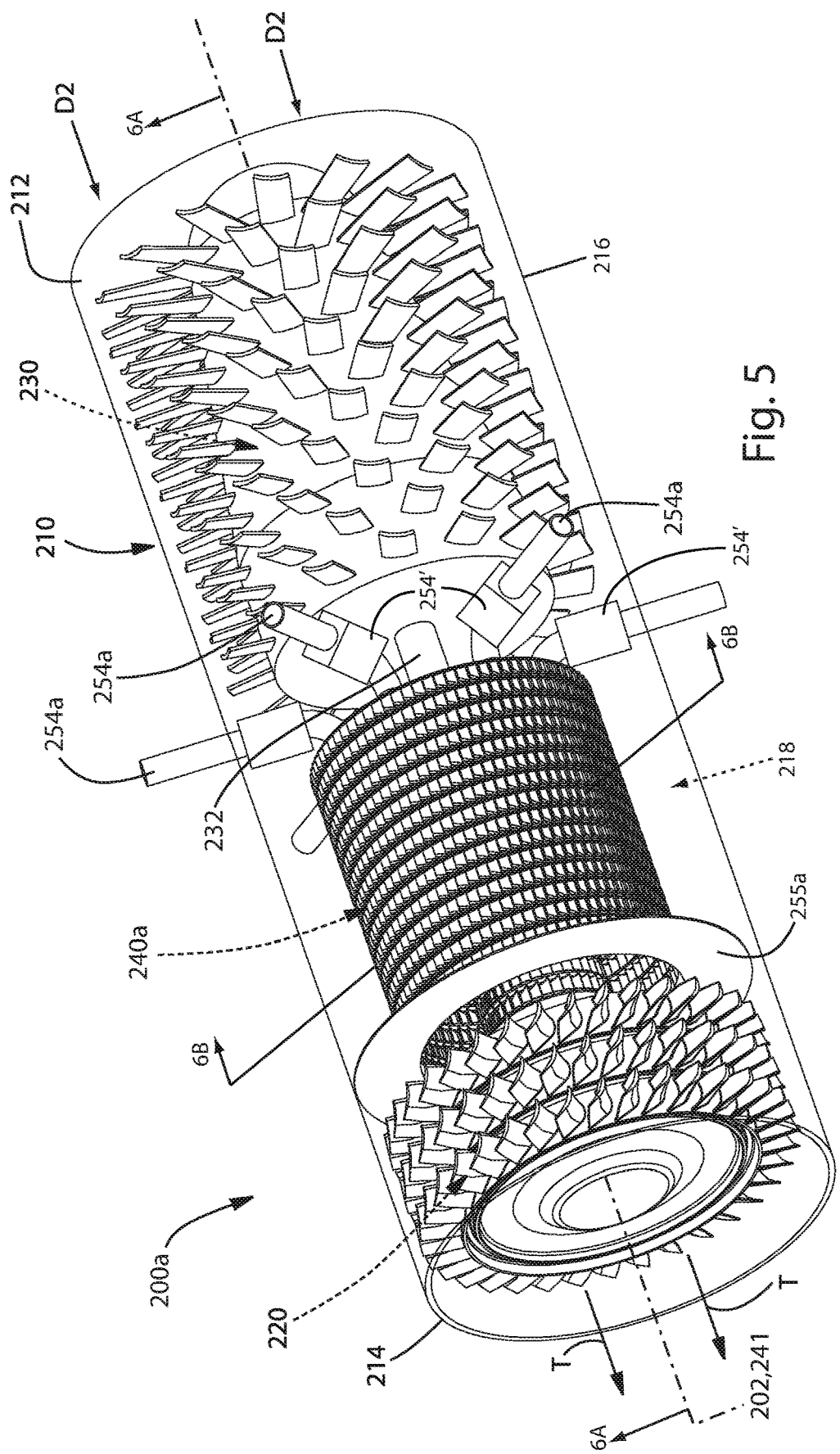
FIG. 5 is a schematic illustration of an alternative combustor for use in a jet engine in accordance with another aspect of the present invention.
Figure 6A:
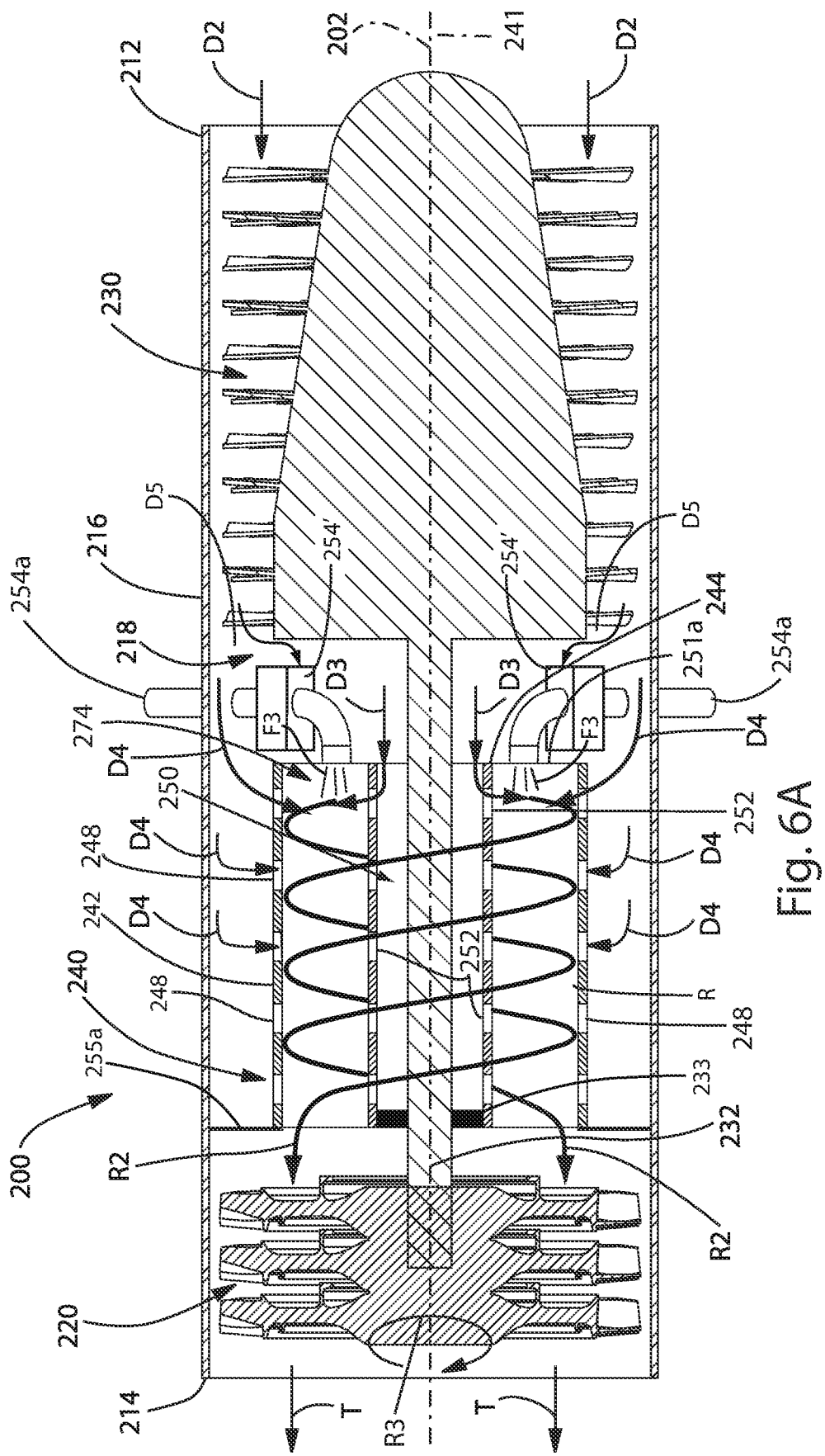
FIG. 6A is a section view taken along line 6A-6A of FIG. 5.

FIGS. 5-6A illustrate a jet engine 200a in accordance with another embodiment of the present invention. Features in FIGS. 5-6A that are identical to features in FIGS. 1-2B have the same reference number as FIGS. 1-2B, whereas features in FIGS. 5-6A that are not similar to features in FIGS. 1-2B are given the suffix "a". FIGS. 5-6A illustrate a jet engine 200a similar to the jet engine 200 of FIGS. 1-2B. In the jet engine 200a of FIGS. 5-6A, the fuel being delivered via the fuel pipe 254a is partially mixed with air prior to being injected into the region 274. The partially pre-mixed fuel is indicated by the reference character F3 and, as seen best in FIG. 6A, the fuel pipe 254a passes through a pre-mix chamber 254'. As seen best in FIG. 6A, the pre-mix chamber 254' receives compressor air indicated by the reference character D5 through a port (not specifically shown) formed in the pre-mix chamber 254'. Fuel passing through the chamber mixes with the incoming air stream (D5) and is injected to the region 274 where it is mixed with additional air D4, D3 delivered through ports 252, 248 formed in the members 244, 242, respectively (see also FIG. 2B).

The jet engine burner shown in FIG. 6A operates essentially similar to the burner shown in FIG. 2A, except that the fuel is pre-mixed with some air prior to being injected into the region 274. The fuel and air movement patterns shown in FIG. 2B are equally applicable to the burner shown in FIG. 6A. In the jet engine 200a of FIGS. 5-6A, however, the fuel delivered by the fuel supply members 254a is partially pre-mixed with the incoming compressed air D5 before being discharged into the chamber 274. This partial fuel mixture is further mixed with compressed air D3 and D4 which is injected through the respective fluid directing structure 252 and 248 and into the fluid passage/combustion chamber 274' where the fully mixed fuel charge is ignited and burned.

The fluid directing structure 252 allows the air D3 within the passage 250 to be directed radially outward into the fluid passage 274, and the fluid directing structure 248 allows the air D4 in the region 277 outside of the outer tube 242 to be directed radially inward into the fluid passage 274. Either or both of the fluid directing structures 248, 252 can have any of the configurations illustrated in FIGS. 3A-4D.

The compressed air D3, D4 mixes with the partial fuel mixture F3 from the fuel supply members 254a to form an air/fuel mixture within the fluid passage 274 that swirls around the axis 241 of the combustor 240a. Due to the configuration of the fluid directing structure 248, the compressed air D4 is imparted with a centrifugal force about the axis 241 of the combustor 240a as it passes into the fluid passage 274. Likewise, the compressed air D3 enters the interior 250 of the inner tube 244 and then through the directing structure 252 of the inner tube 244 and into the fluid passage 274, thereby imparting a centrifugal force upon the air/fuel mixture about the axis 241 of the combustor 240a.

Those having ordinary skill in the art will appreciate that a mixture of air and fuel is formed in the fluid passage and imparted with a centrifugal force that causes the air/fuel mixture within the fluid passage 274 to rotate or spiral around the central axis of the combustor, thus improving and stabilizing combustion.

Figure 7:
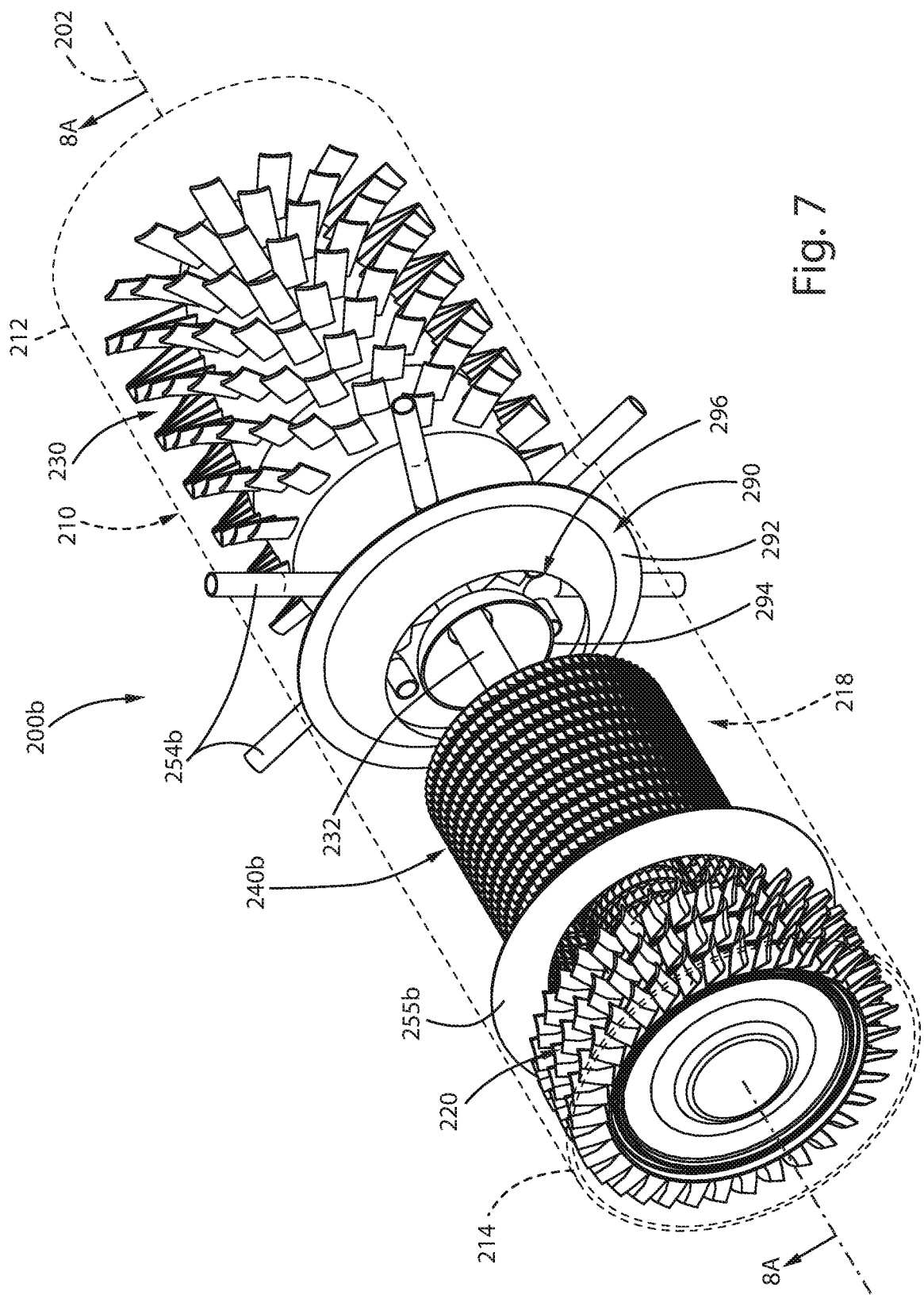
FIG. 7 is a schematic illustration of an alternative combustor for use in a jet engine in accordance with another aspect of the present invention.
Figure 8A:
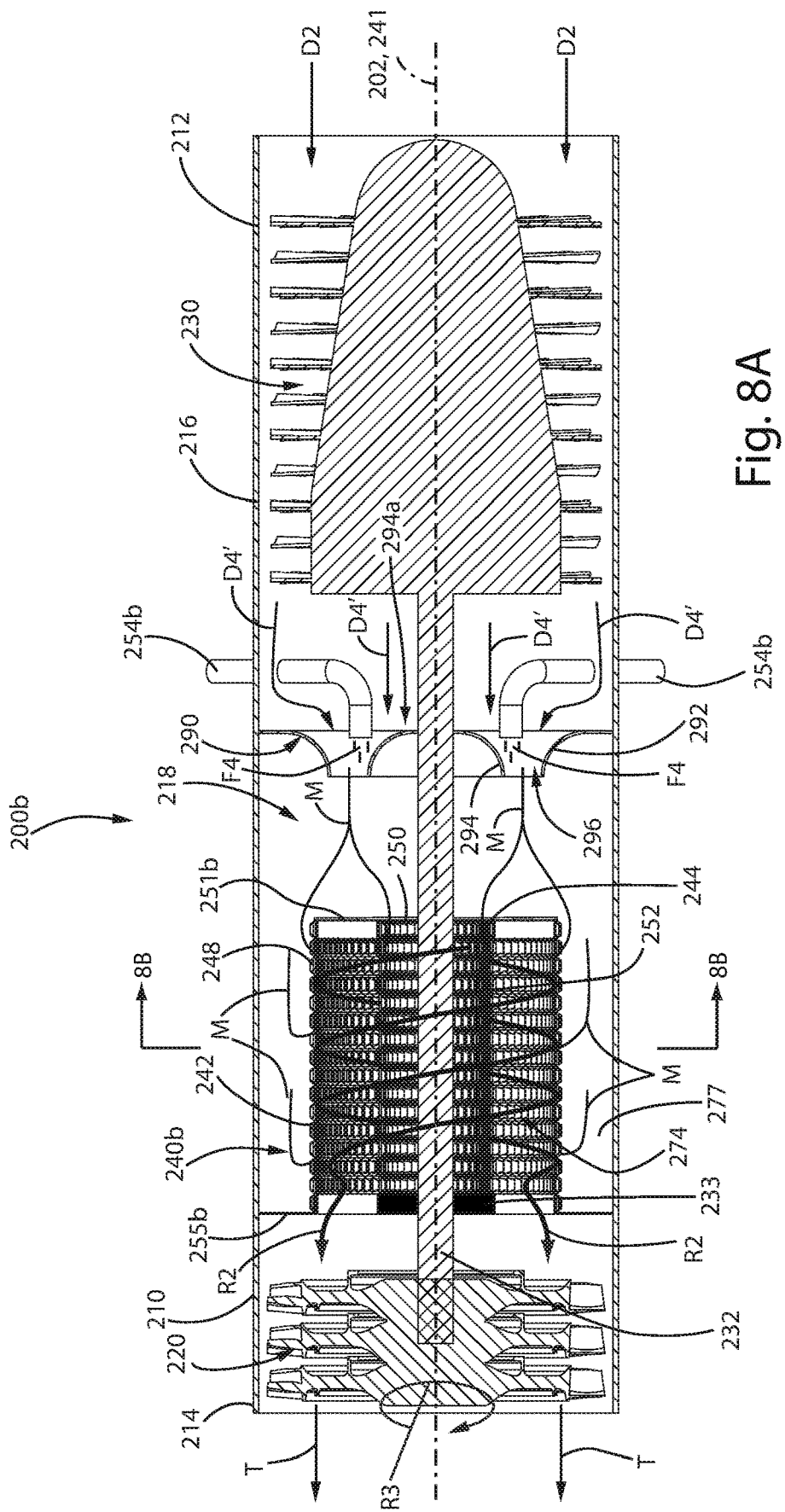
FIG. 8A is a section view taken along line 8A-8A of FIG. 7.
Figure 8B:
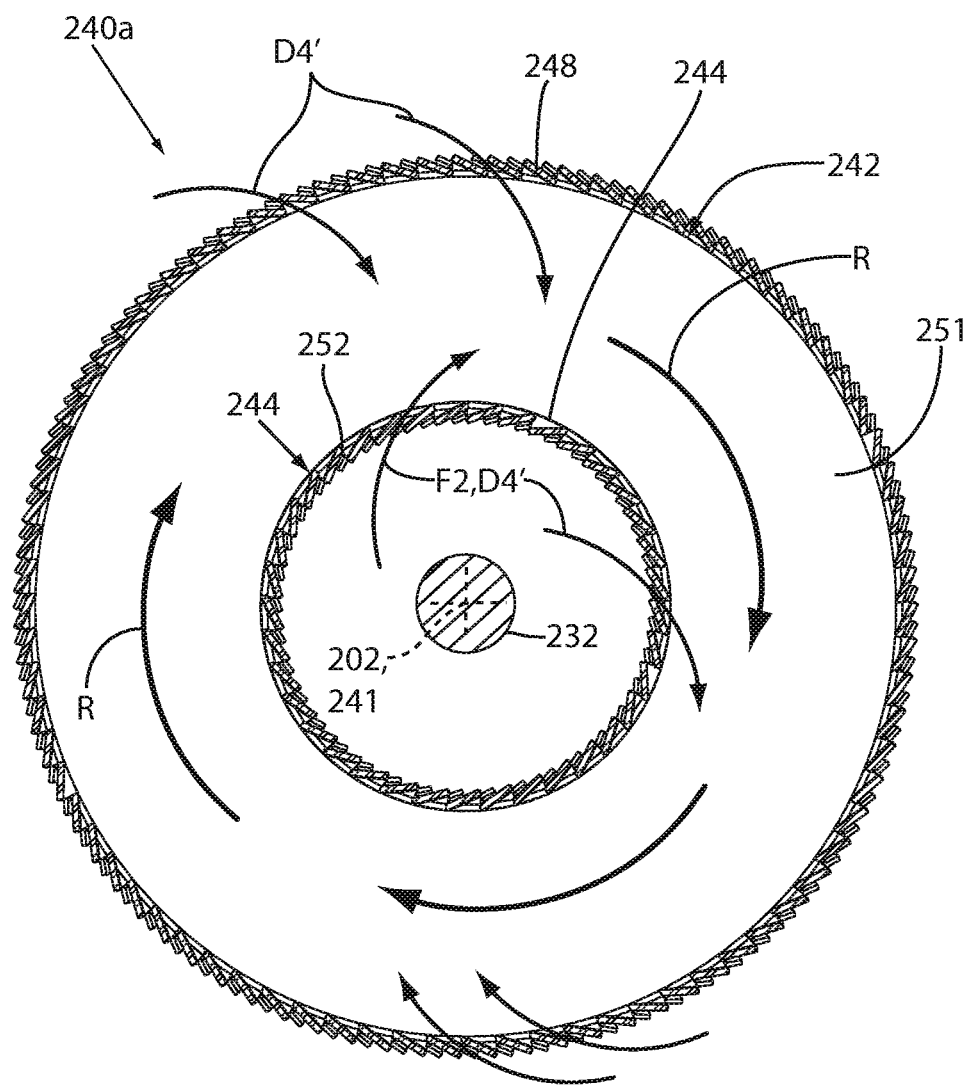
FIG. 8B is a section view taken along line 8B-8B of FIG. 7.

FIGS. 7-8 illustrate a jet engine 200b in accordance with another embodiment of the present invention. Features in FIGS. 7-8 that are identical to features in FIGS. 1-2B or FIGS. 5-6A have the same reference number as FIGS. 1-2B or FIGS. 5-6A, whereas features in FIGS. 7-8 that are not similar to features in FIGS. 1-2B are given the suffix "b". Similar to the jet engine 200 of FIGS. 1-2B, a wall 251b is secured to the end of the combustor 240b closer to the compressor 230 and a wall 255b is secured to the end of the combustor closer to the turbine 220. In the jet engine 200b of FIGS. 7-8, however, the fuel F4 is injected upstream from the combustor and is completely mixed with compressed air D4' before entering the combustor 240b.

The jet engine 200b of FIGS. 7-8 includes a fluid mixing element 290 secured to the housing 210 for pre-mixing the compressed air D4' and fuel F4 exiting the fuel supply members 254b such that the air and fuel is completely mixed prior to entering the combustor 240b. The fluid mixing element 290 is positioned along the axis 202 of the jet engine 200b between the fuel supply members 254b and the combustor 240b and includes an outer element 292 and an inner element 294 positioned concentric to one another and the connecting member 232. The outer element 292 is ring-shaped and has a generally frustoconical configuration that tapers radially inward in a direction extending towards the combustor 240b, i.e., leftward as viewed in FIG. 8. The inner element 294 is positioned in the interior of the outer element 292 and is secured to or integrally formed with the outer element. The compressor/turbine connecting member 232 extends through an opening indicated generally by the reference character 294a in the inner element 294.

An annular gap 296 extends between the inner element 294 and the outer element 292 and tapers inwardly in a direction extending towards the combustor 240b, i.e., the cross-sectional area of the gap along the axis 202 decreases in the direction towards the combustor. The fluid mixing element 290 is configured such that the compressed air D4' from the compressor and the fuel F4 exiting the fuel supply members 254b must pass through the gap 296 in the mixing element in order to reach the combustor 240b. Since the cross-sectional area of the gap 296 decreases along the length of the fluid mixing element 290, the compressed air D4' and fuel F4 become mixed together as the air and fuel travel through the fluid mixing element. The air D4' and fuel F4 exit the fluid mixing element 290 as a fully pre-mixed mixture, indicated generally as M in FIG. 8. Although the fluid mixing element 290 is illustrated as having a particular construction, those having ordinary skill will appreciate that any structure or structures can be used that are configured to mix the compressed air D4' and fuel F4 to form a fully pre-mixed mixture M that enters the combustor 240b to be ignited.

The mixture M enters the combustor 240b along two different pathways. Some of the mixture M flows to the region 277, i.e., the exterior of the combustor 240b between the wall 216 of the housing 210 and the outer tube 242, where it is directed radially inward by the fluid directing structure 248 of the outer tube 242 into the fluid passage 274. The remainder of the mixture M flows into the interior 250 of the inner tube 244 where it is directed radially outward by the fluid directing structure 252 of the inner tube into the fluid passage 274. The fluid directing structures 248, 252 cause the collective mixture M to swirl within the fluid passage 274 around the axis 241 of the combustor 240b in a manner similar to that illustrated in FIG. 2B. The mixture M is then ignited within the fluid passage 274 by an ignition source (not shown) and the combustion products of the ignited mixture are expelled from the combustor 240b towards the turbine 220 in the manner indicated generally by arrows R2 in order to drive the turbine in the manner described.

Figure 10:
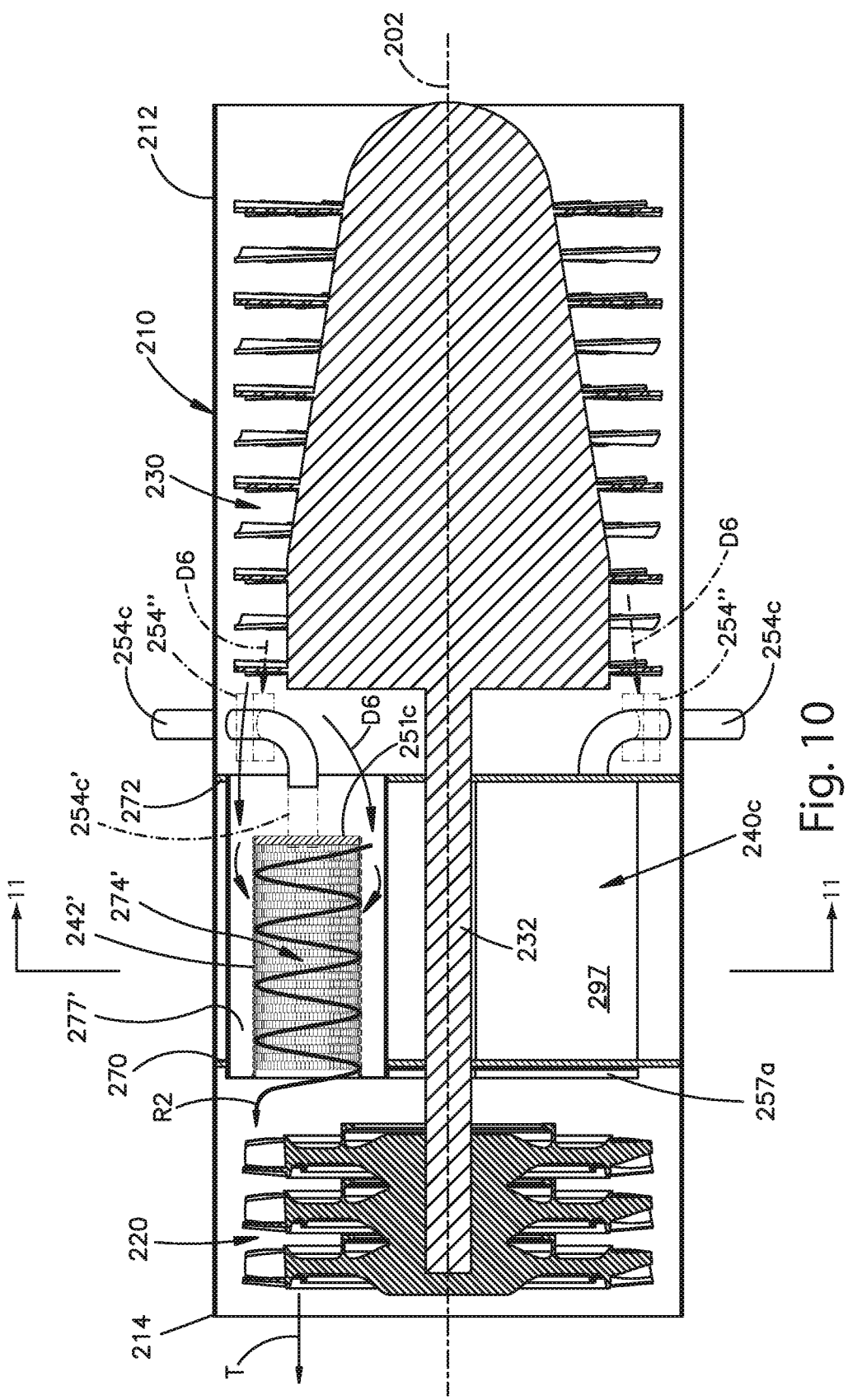
FIG. 10 is a section view taken along line 10-10 of FIG. 9.
Figure 11:
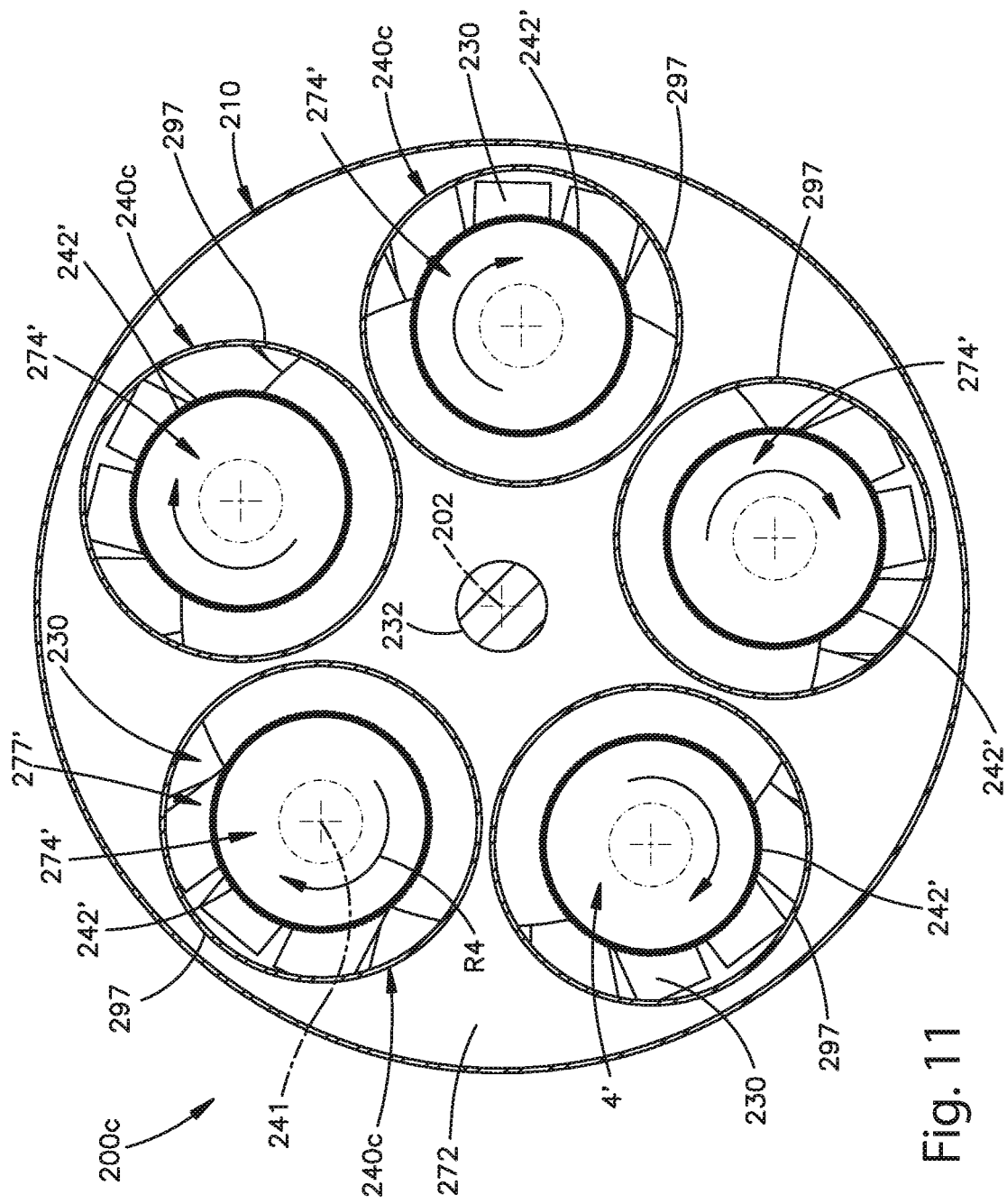
FIG. 11 is a section view taken along line 11-11 of FIG. 10.

FIGS. 9-11 illustrate a jet engine 200c in accordance with another aspect of the present invention. In the jet engine 200c of FIGS. 9-11, a plurality of combustors 240c is arranged about the central axis 202 of the jet engine. Each of the combustors 240c can constitute the non-pre-mixed combustor 240 of FIGS. 1-2B, the partially pre-mixed combustor 240a of FIGS. 5-6B or the fully pre-mixed combustor 240b of FIGS. 7-8 or modifications thereof. Features in FIGS. 9-11 that are identical to features in FIGS. 1-8 have the same reference number as FIGS. 1-8, whereas features in FIGS. 9-11 that are similar to features in FIGS. 1-8 are given the suffix "c".

As shown in FIG. 9, the compressor 230 and the turbine 220 are positioned within the housing 210 on opposing sides of the combustors 240c. The combustors 240c are preferably axially aligned with one another and are radially spaced about the axis 202 of the jet engine 200c (FIG. 9). Although five combustors 240c are illustrated in FIGS. 9-11, it will be appreciated that more or fewer combustors can be provided in accordance with the present invention. Furthermore, the combustors 240c can be symmetrically or asymmetrically spaced about the central axis 202. The combustors 240c can extend substantially parallel to one another and the axis 202 or can extend at an angle relative to one another and/or the axis. A wall 270 is provided between the wall 212 of the housing 210 and the combustors 240c and between the combustors to ensure that fluid only flows into the combustors, i.e., not around or between the combustors and the wall of the housing. Another wall 272 is also preferably provided to prevent air or fuel/air from bypassing the combustors. The walls 270, 272 can also serve as mounting plates or supports for the combustors 240c.

The combustors 240c are different from the combustors 240, 240a, 240b in that no inner tube is used. The outer tube 242' of the combustor has fluid directing structure 248 such that the mixture of air and fuel is directed from a fluid passage 277' radially inward through the fluid directing structure into the interior 274'. In this configuration, each combustor 240c includes a solid outer wall 297 that has a continuous surface such that no fluid passes radially through it. A cap 251c is provided on each combustor 240c to fluidly seal the upstream end of the tube 242 closer to the turbine 200 such that air and/or the fuel/air mixture cannot axially enter the passage 274' of the combustor 240c, i.e., the air and/or fuel mixture must pass radially inward through the fluid directing structure 248' and into the interior passage 274'. The downstream end of the annular passage 277' is sealed by a cap 257a which ensures that all the air (or fuel-air mixture) travels into the combustion passage 274'.

Air exiting the compressor 230 is distributed amongst the combustors 240c. The air is mixed with fuel delivered by the fuel pipe 254c and is ultimately swirled and burned in the inner combustion chamber 274'. Several methods and apparatus for injecting fuel into the burner 240c are illustrated in FIG. 10. A fuel pipe 254c is shown in solid and, in the solid configuration, fuel is injected upstream of the combustor 240c where it is fully mixed with air delivered by the compressor 230 as described in connection with FIGS. 7, 8A and 8B. This fully mixed fuel/air charge then enters the region 277' and travels into the combustion passage 274' via ports 248 formed in the tubular member 242'. As explained earlier, the ports are arranged to cause rotation of the fuel/air mixture in the combustion passage 274'.

In an alternate embodiment, each combustor 240c utilizes the fuel/air delivery system described in connection with FIGS. 5 and 6A. A fuel pipe 254c' includes a pre-mix chamber 254". In this configuration, the fuel being delivered by the fuel pipe 254c' is partially mixed with air received by the pre-mix chamber 254" from the compressor 230. This partial fuel mixture is injected into the chamber 274' through the cap 251c where it fully mixed with compressor air D6 that enters the chamber 274' via the passage 277' and then the ports 248 formed in the tubular member 242'.

In still another embodiment, the combustors 240c utilize the fuel/air delivery system described in connection with FIGS. 1 and 2A. In this configuration, the fuel is injected directly into the combustion passage 274' via the fuel pipe 254c, the downstream end of which extends thought the cap 251c. The injected fuel is mixed with the swirling air delivered through the tubular members 242' and 252.

In all of these embodiments, an igniter (not shown) within the interior 274' of the tube member 242' of each combustor 240c ignites the swirling air/fuel mixtures. The swirling combustion products collectively exit the combustors 240c and pass through the turbine 220, causing rotation of the turbine and expulsion of the combustion products from the jet engine 200c.

Figure 12A:
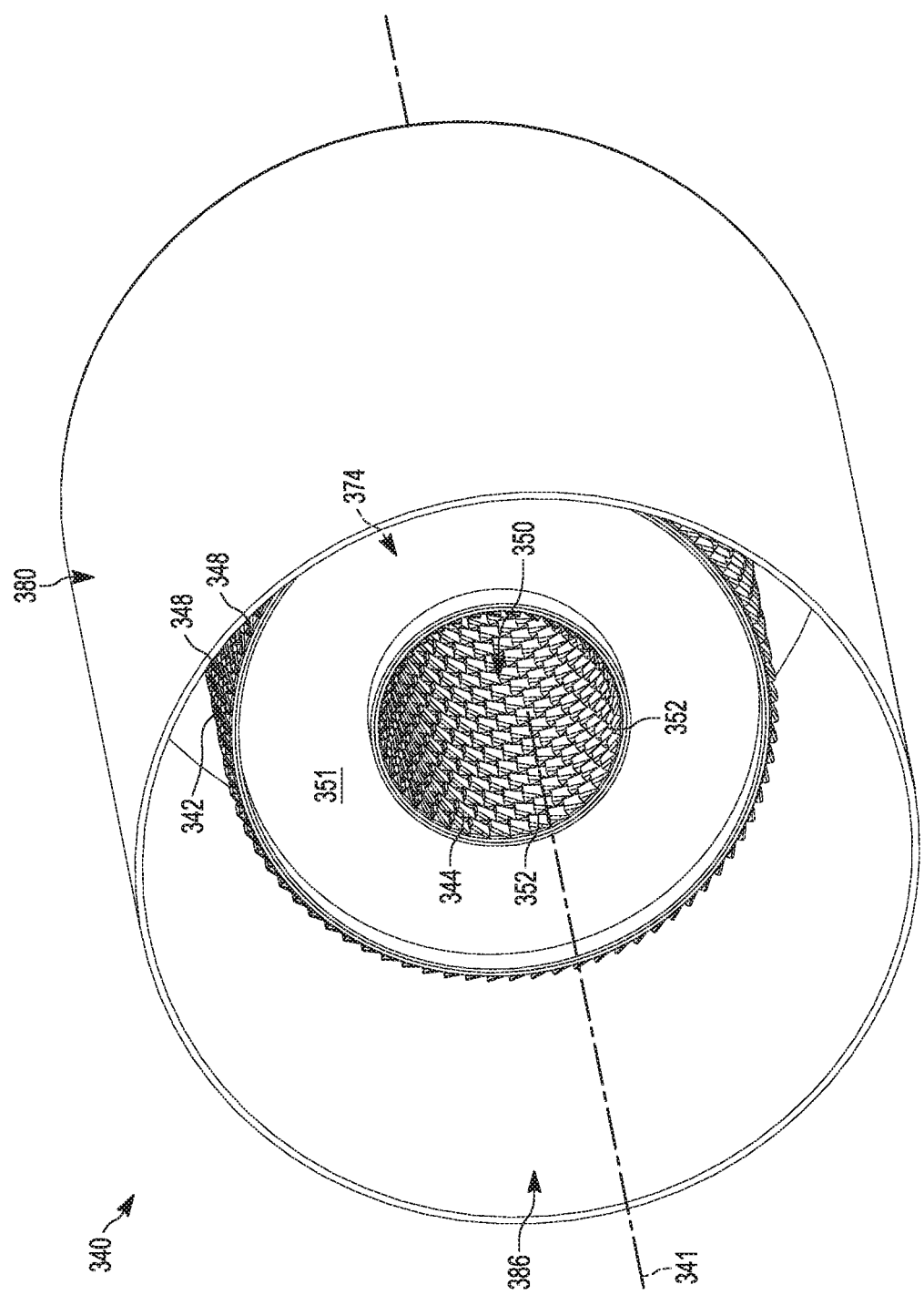
FIG. 12A is a schematic illustration of a combustor for an appliance in accordance with another aspect of the present invention.
Figure 12B:
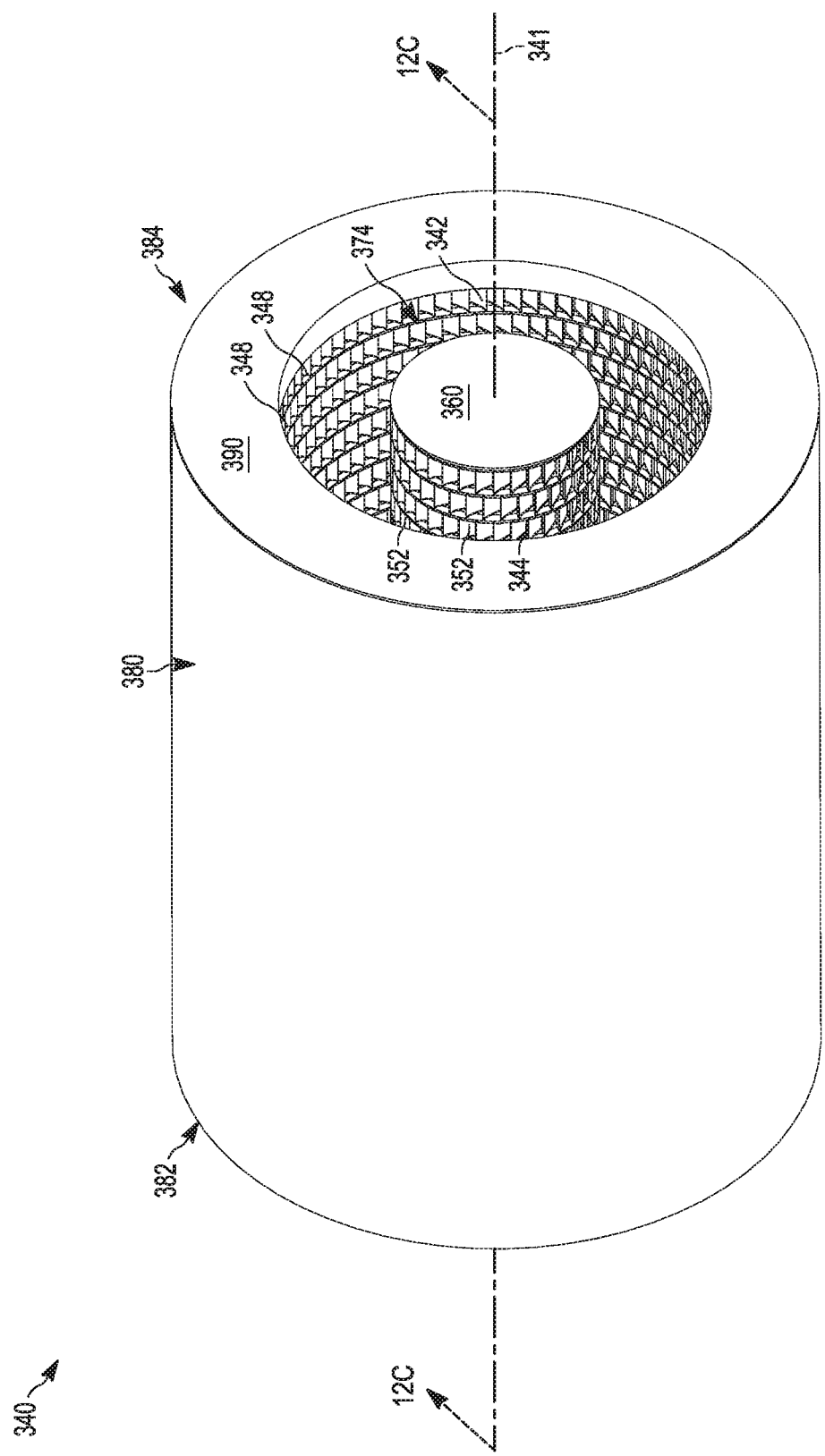
FIG. 12B is a rear view of the combustor of FIG. 12A.
Figure 12C:
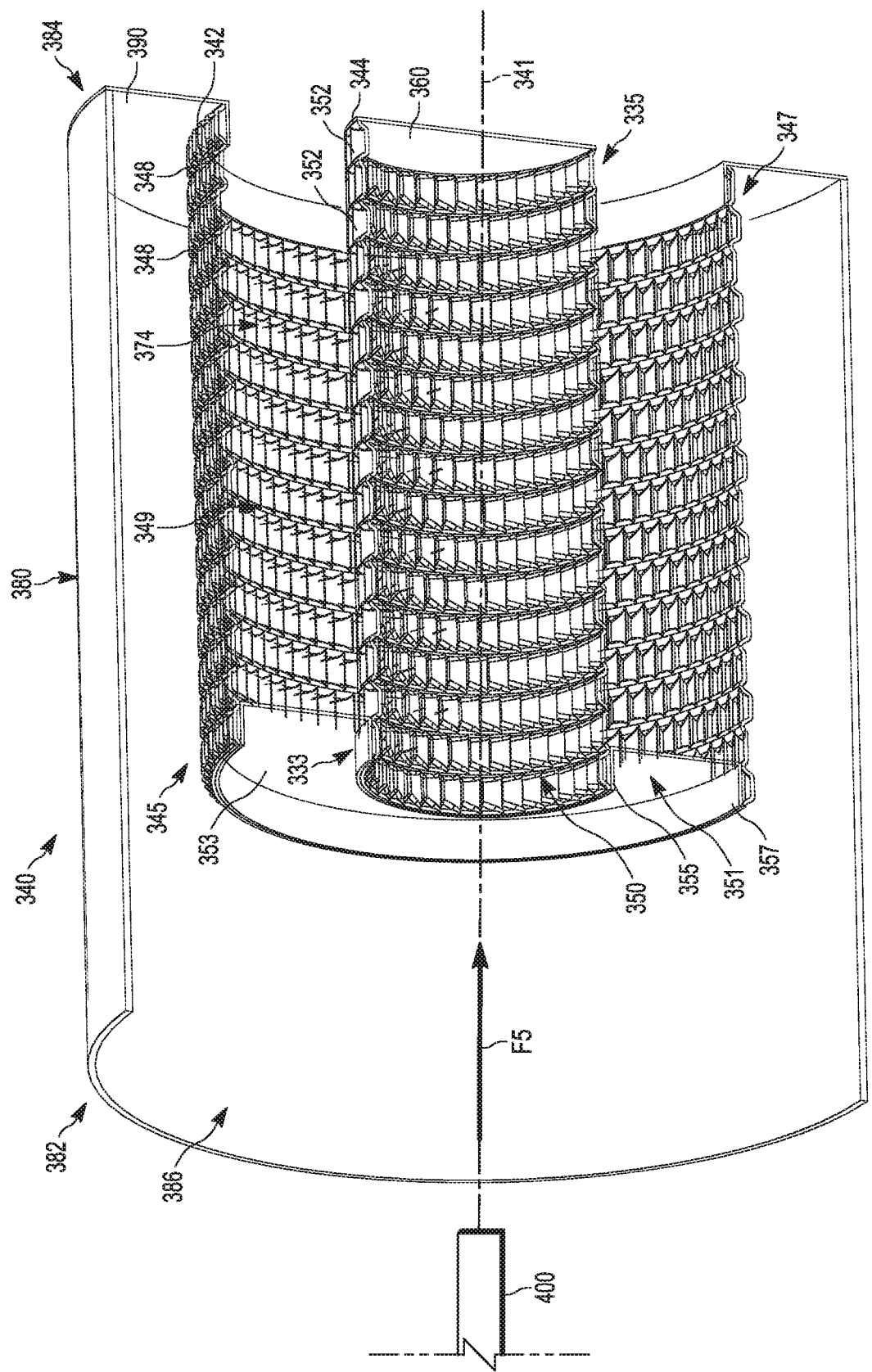
FIG. 12C is a section view taken along line 12C-12C of FIG. 12B.

FIGS. 12A-12D illustrate a combustor or fuel burner 340 in accordance with another aspect of the present invention. The combustor 340 can be used in industrial, household, and commercial heating appliances such as, for example, a water heater, boiler, furnace, etc. The combustor 340 includes outer and inner tubes 342, 344 that are concentric with one another about a central axis 341. Referring to FIG. 12C, the outer tube 342 extends from a first end 345 to a second end 347 and defines an interior or central passage 349. The inner tube 344 extends from a first end 333 to a second end 335 and defines an interior or central passage 350 for receiving a pre-mixed mixture of combustible fuel and air. The combustible fuel can be a liquid, e.g., atomized or vaporized, or gas.

The space between the outer and inner tubes 342, 344 defines a fluid passage 374. The periphery of the inner tube 342 includes fluid directing structure 352 for directing fluid radially outward from the central passage 350 to the fluid passage 374. The periphery of the outer tube 342 includes fluid directing structure 348 for directing fluid radially inward to the fluid passage 374. The fluid directing structures 348, 352 can constitute any of the aforementioned fluid directing structures or combinations thereof (see FIGS. 3A-4D).

A ring-shaped wall 351 is secured to the first ends 333, 345 of the outer and inner tubes 342, 344. The wall 351 includes a ring-shaped base 353 and a pair of annular flanges 355, 357 extending from the base. The flange 355 is secured to the first end 333 of the inner tube 344 in a fluid-tight manner. The flange 357 is secured to the first end 345 of the outer tube 342 in a fluid-tight manner. Consequently, the wall 351 seals one end of the fluid passage 374 in a fluid-tight manner. Another wall 360 is secured to the second end 335 of the inner tube 344 and seals the second end of the inner tube in a fluid-tight manner.

The outer and inner tubes 342, 344 are positioned in a housing 380 extending from a first end 382 to a second end 384. The housing 380 is centered on the axis 341 and defines an interior 386 for receiving the outer and inner tubes 342, 344. An end wall or plate 390 is secured to the second end 384 of the housing 380 and the second end 347 of the outer tube 342 to secure the housing to the outer tube. The wall 390 is secured to the outer tube 342 in a fluid-tight manner and is sized such that the housing 380, outer tube 342, and inner tube 344 are concentric.

Figure 12D:
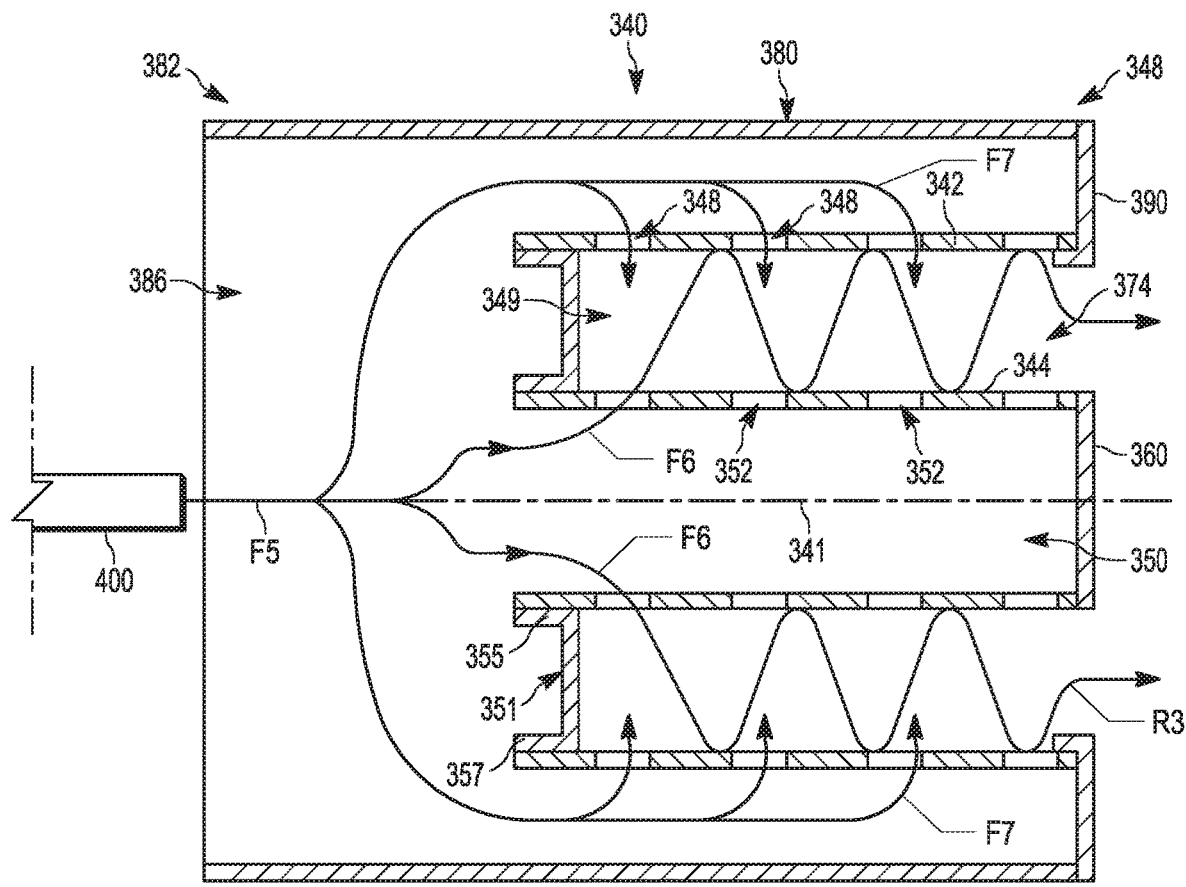
FIG. 12D is a schematic illustration of the combustor of FIG. 12A in use.

Referring further to FIG. 12D, one or more supply members 400 carrying a fully pre-mixed mixture of combustible fuel and air, indicated by reference character F5, are positioned upstream of the outer and inner tubes 342, 344. The supply member 400 is generally aligned with and extend towards the central passage 350 to establish a direct fluid path between the supply member and the central passage. The supply member 400 can extend axially towards into the housing 380 (as shown) or radially inward through the housing, e.g., have an L-shaped configuration similar to the fuel supply members 254 in FIGS. 1-2A (not shown). In any case, the supply member 400 delivers the pre-mixed mixture F5 to the interior 386 of the housing 380.

Due to the configuration of the fuel burner 340 the pre-mixed mixture F5 is divided into two pre-mixed portions F6, F7 that take different flow paths from the interior 386 of the housing 380 to the fluid passage 374. The pre-mixed portion F6 flows into the central passage 350 at the first end 333 of the inner tube 344. The end wall 360 prevents the pre-mixed portion F6 from exiting the second end 335 of the inner tube 344 except through the fluid directing structure 352. Consequently, the pre-mixed portion F6 is directed radially outward through the fluid directing structure 352 into the fluid passage 374. When this occurs, the fluid directing structure 352 imparts a centrifugal force upon the pre-mixed portion F6 such that the pre-mixed portion swirls about the axis 341 of the combustor 340 while flowing through the fluid passage 374.

At the same time, the pre-mixed portion F7 flows to the radial space between the housing 380 and the outer tube 342. At this point, the fluid directing structure 348 directs the pre-mixed portion F7 radially inward into the fluid passage 374. The end wall 390 prevents the pre-mixed portion F7 from exiting the second end 384 of the housing 380 except through the fluid directing structure 348. Due to the configuration of the fluid directing structure 348, the pre-mixed portion F7 is imparted with a centrifugal force about the axis 341 of the combustor 340 as it passes radially inward into the fluid passage 374.

It is therefore clear that the pre-mixed mixture F5 flows along multiple flow paths—a portion F6 flowing radially outward through the fluid directing structure 348 and a portion F7 flowing radially inward through the fluid directing structure 352—to reach the fluid passage 374. The pre-mixed portions F6, F7 of the pre-mixed mixture F5 are recombined within the fluid passage 374 and collectively swirl around the axis 341 of the combustor 340 and between the inner and outer tubes 342, 344.

The combustor 340 is specifically configured to restrict fluid flow therethrough to what has been described. In addition to the aforementioned walls 360, 390, the end wall 351 prevents the pre-mixed portions F6, F7 and any flame produced therefrom from exiting the fluid passage 374 through the first ends 333, 345 of the inner and outer tubes 342, 344. Consequently, the pre-mixed mixture F5 can only enter the fluid passage 374 by passing through the respective fluid directing structures 352 and 348.

That said, the combustion products from the ignited air/fuel mixture exit the combustor 340 rotating within the fluid passage 374 and about the central axis 341 of the combustor 340 as indicated generally by arrows R3 in FIG. 12D. The rotating, spiraling air/fuel mixture R3 is ignited by an ignition device (not shown) of any number of types well known in the art and positioned in any number of suitable locations to light the combustor 340. For example, the wall 351 can be provided with an opening (not shown) through which an igniter extends. Flame proving means (not shown) can be positioned in any number of suitable locations to detect the presence of flame.

It will be appreciated that the combustor 340 of FIGS. 12A-12D can be used in the same manner as the combustors 240, 240a, 240b are used and can therefore receive a fully pre-mixed mixture or partially pre-mixed mixture and additional air in accordance with the present invention.

Figure 13A:
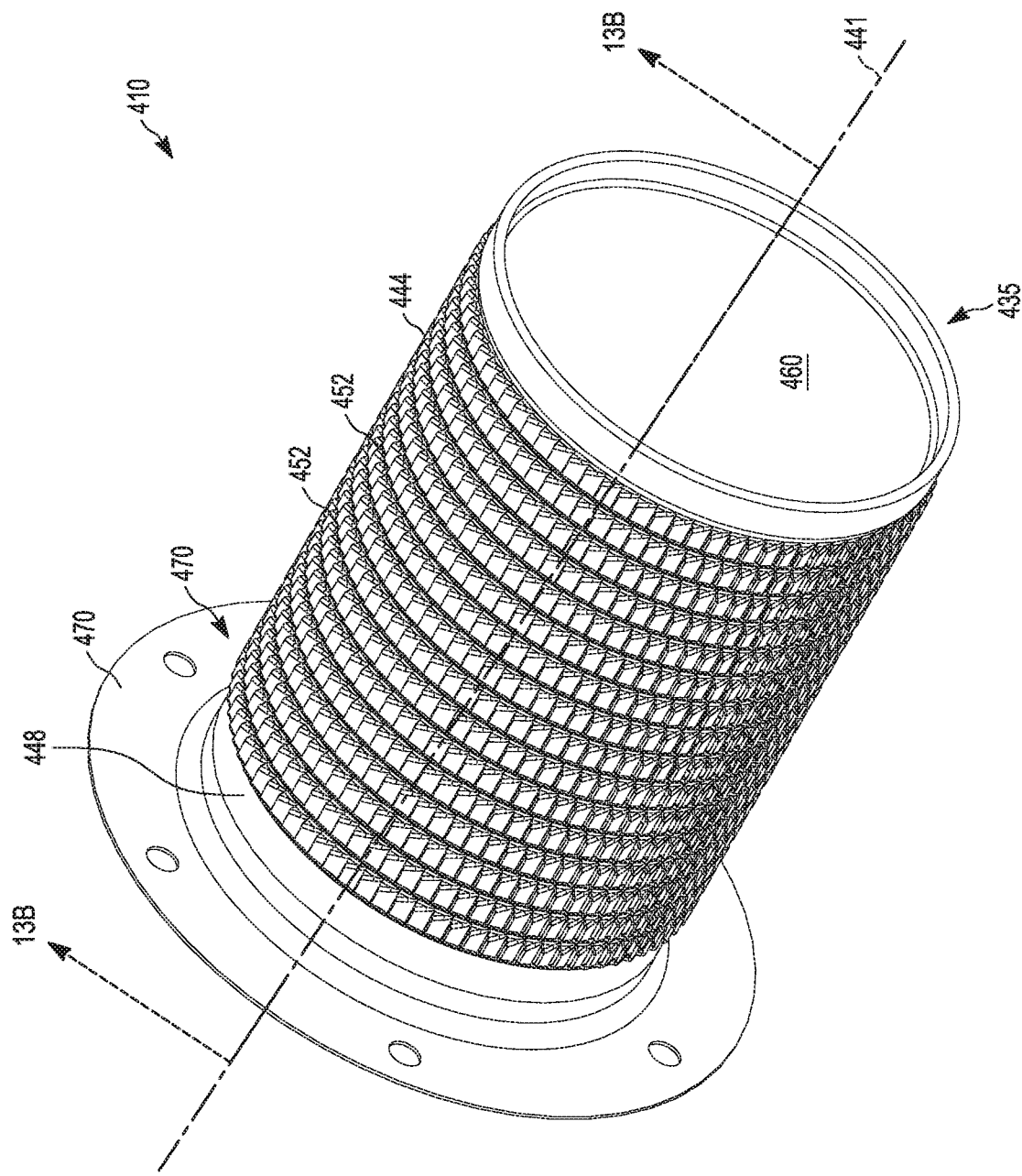
FIG. 13A is a schematic illustration of a combustor for an appliance in accordance with another aspect of the present invention.
Figure 13B:
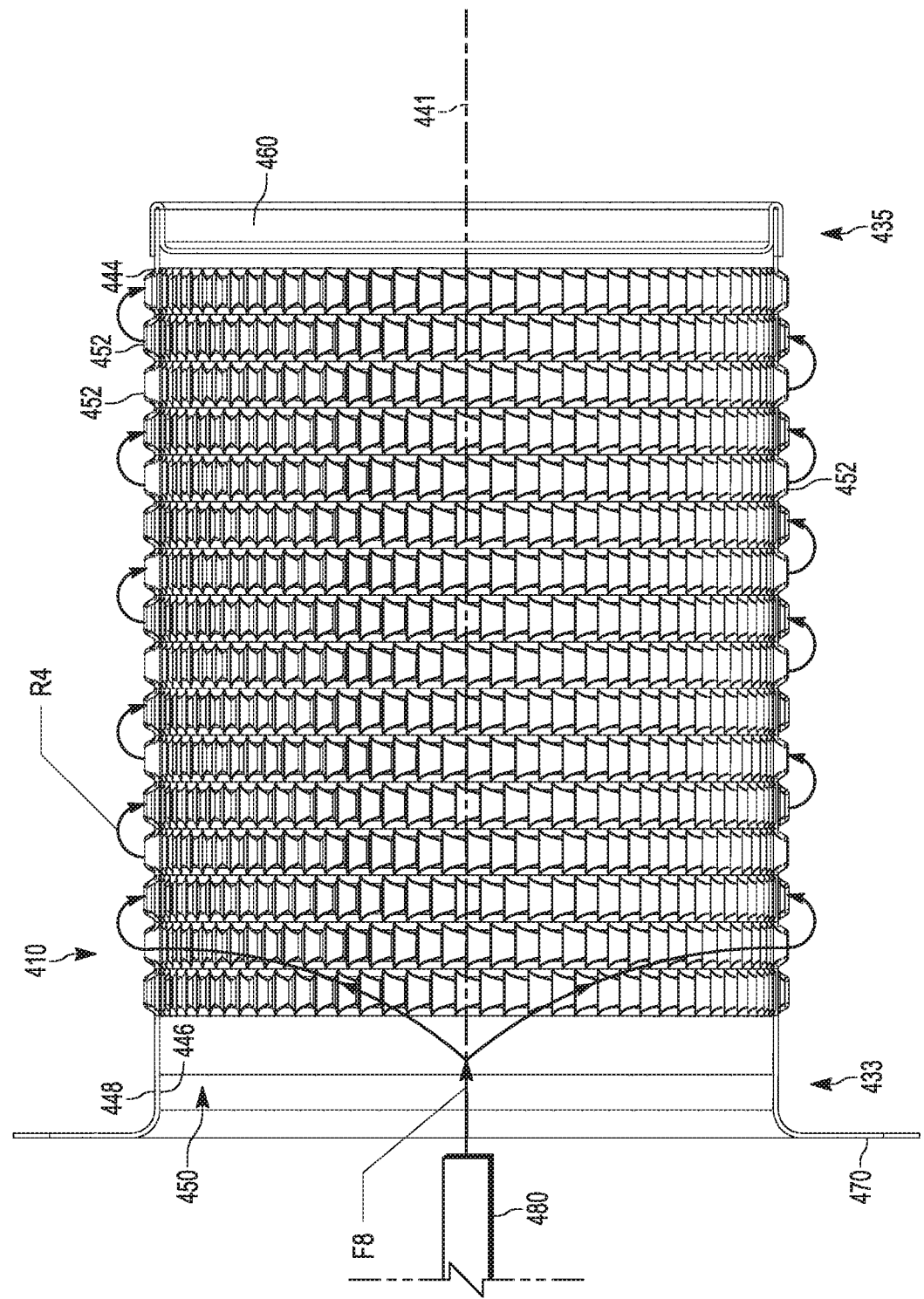
FIG. 13B is a section view taken along line 13B-13B of FIG. 13A

FIGS. 13A-13B illustrate a combustor or fuel burner 410 in accordance with another aspect of the present invention. The combustor 410 constitutes an external swirl burner that can be used in industrial, household, and commercial heating appliances such as, for example, a water heater, boiler, furnace, etc. More specifically, the combustor 410 produces a swirling, spiraling and/or rotating flame about and along its exterior in a simple, inexpensive, and efficient manner.

The combustor 410 includes a tube 444 extending along a central axis 441 from a first end 433 to a second end 435. The tube 444 includes an inner surface 446 defining an interior or central passage 450 and an outer surface 448. The first end 433 of the tube 444 includes a flange 470 for securing the combustor 410 to, for example, a portion of the appliance. A wall 460 is secured to the second end 435 of the tube 444 to seal one end of the central passage 450 in a fluid-tight manner. In this example, the combustor 410 does not include an outer tube or housing and, thus, the tube 444 defines both the exterior and interior of the combustor 410.

The periphery of the tube 444 includes fluid directing structure 452 for directing fluid radially outward from the central passage 450 to a position adjacent to and radially outward of the outer surface 448 and fluid directing structure 452, i.e., exterior to or outside of the tube. The fluid directing structure 452 can constitute any of the aforementioned fluid directing structures or combinations thereof (see FIGS. 3A-4D).

As shown in FIG. 13B, the central passage 450 is configured to receive a pre-mixed mixture of combustible fuel and air. The combustible fuel can be a liquid, e.g., atomized or vaporized, or gas. To this end, one or more supply members 480 carrying a fully pre-mixed mixture of combustible fuel and air, indicated by reference character F8, are positioned upstream of the tube 444. The supply member 480 is generally aligned with and extends towards the central passage 450 to establish a direct fluid path between the supply member and the central passage. The supply members 480 extend axially towards and/or into the tube 444 and deliver the pre-mixed mixture F8 to the central passage 450.

The pre-mixed mixture F8 flows into the central passage 450 at the first end 433 of the tube 444. The end wall 460 prevents the pre-mixed mixture F8 from exiting the second end 435 of the tube 444 except through the fluid directing structure 352. Consequently, the pre-mixed mixture F8 is directed radially outward through the fluid directing structure 452 to the tube exterior. When this occurs, the fluid directing structure 452 imparts a centrifugal force upon the pre-mixed mixture F8 such that the pre-mixed portion swirls about the axis 441 of the combustor 840 while flowing about the tube exterior.

The combustion products from the ignited air/fuel mixture exit the combustor 440 rotating about the central axis 441 of the combustor 340 around the exterior of the tube 444 as indicated generally by arrows R4 in FIG. 13B. To this end, the rotating, spiraling air/fuel mixture R4 is ignited by an ignition device (not shown) of any number of types well known in the art and positioned in any number of suitable locations to light the combustor 440. Flame proving means (not shown) can be positioned in any number of suitable locations to detect the presence of flame. The ignited air/fuel mixture R4 is directed into, for example, the heat exchange tube of the heating appliance.

The combustor of the present invention is advantageous over conventional combustors or burners for several reasons. Unlike conventional combustors in which the flame is propagated primarily by molecular conduction of heat and molecular diffusion of radicals from the flame into the approaching stream of reactants, i.e., the air/fuel mixture, the combustor of the present invention forces additional heat transfer by convection and radiation from the high velocity flame envelope overlaying and intermixing with the incoming air/fuel mixture. The incoming air/fuel mixture is preheated while the flame zone is being cooled, which advantageously helps to reduce $NO_x$. The flame envelope is advantageously spaced entirely from the inner surface of the inner tube when the air/fuel mixture is ignited within the inner tube and spaced entirely from the outer surface of the inner tube when the air/fuel mixture is ignited within the fluid passage.

Radicals are also forced into the incoming reactant stream by the overlaying and intermixing flame envelope. The presence of radicals in a mixture of reactants lowers the ignition temperature and allows the fuel to burn at lower than normal temperature. It also helps to significantly increase flame speed, which shortens the reaction time, thereby additionally reducing $NO_x$ formation while significantly improving flame stability/flame retention. The improved stability and flame retention reduces the chances of flame out.

Due to the exceptional flame retention/stability of the combustor of the present invention, it is capable of running at very high combustion loadings. High loadings allow the burner to run in a stable "lifted flame" mode i.e., the flame is spaced from the combustor surfaces. Lifting of the flame in this manner is desirable in that the combustor surfaces are not directly heated, thereby maintaining the surfaces at a lower temperature and lengthening the usable life of the combustor. A high combustion loading also allows the use of a smaller, space saving, and less costly combustor for a given application.

Furthermore, the combustor of the present invention, due to the exceptional flame retention as discussed above, is also capable of operating cleanly (low CO) at very high levels of excess air, which produces NOx levels well below those achievable with conventional combustors.

The preferred embodiments of the invention have been illustrated and described in detail. However, the present invention is not to be considered limited to the precise construction disclosed. For example, it will be understood that any of the combustors described above can incorporate a "variable volume" combustion chamber, e.g., fluid passage, by configuring the wall 251c (shown in FIG. 9) secured to the inner and outer tubes to be movable along the axis of the jet engine. Such a construction would allow for optimized combustion performance by matching the combustion chamber volume to the power output required.

The invention has been described in detail in connection with a jet engine application. Those skilled in the art will recognize that the principles of this invention can be applied to burners used in heating appliances such as hot water tanks, furnaces and boilers. Those skilled in the art will recognize that the disclosed burner configurations can be adapted for use in the identified heating applications. For some applications, the burner would be configured as a power burner in which a blower or the suitable device would force air into the burner where it would be mixed with the suitable liquid fuel such as fuel oil or a gaseous fuel such as natural gas or propane.

Various adaptations, modifications and uses of the invention can occur to those skilled in the art to which the invention relates and the intention is to cover hereby all such adaptations, modifications, and uses which fall within the spirit or scope of the appended claims.

Having described the invention, the following is claimed:

1. A fuel burner comprising:
   an outer tube extending along a central axis from a first end to a second end, the outer tube including an outer surface and an inner surface defining a passage, the outer tube including fluid directing structure having a plurality of openings and a guide associated with each opening;
   an inner tube extending from a first end to a second end and being positioned within the passage of the outer tube, the inner tube including an outer surface and an inner surface defining a central passage, wherein a fluid passage is defined between the outer surface of the inner tube and the inner surface of the outer tube, the central passage being supplied with a mixture of air and combustible fuel pre-mixed upstream of the inner tube, the inner tube having fluid directing structure for directing the pre-mixed mixture radially outward from the central passage to the fluid passage such that the pre-mixed mixture rotates radially about the central axis between the inner tube and the outer tube, the fluid directing structure on the outer tube being supplied with the pre-mixed mixture and directing the pre-mixed mixture radially inward to the fluid passage to mix with the pre-mixed mixture from the fluid directing structure on the inner tube;
   a first end wall closing the second end of the inner tube in a fluid-tight manner; and
   a second end wall securing the first end of the inner tube to the outer tube in a fluid-tight manner such that the fluid directing structure on the inner tube provides the only fluid path from the central passage to the fluid passage.

2. The fuel burner of claim 1, wherein the fluid directing structure on the inner tube includes a plurality of openings and a guide associated with each opening, the guides being angled relative to the inner surface for radially rotating the pre-mixed mixture about the central axis.

3. The fuel burner of claim 2, wherein the guides are arranged in a series of rows that extend continuously around the periphery of the inner tube to encircle the central axis.

4. The fuel burner of claim 2, wherein the fluid directing structure on the outer tube includes a plurality of openings and a guide associated with each opening, the guides being angled relative to the inner surface for radially rotating the pre-mixed mixture about the central axis.

5. The fuel burner of claim 4, wherein the guides are arranged in a series of rows that extend continuously around the periphery of the inner tube to encircle the central axis.

6. The fuel burner of claim 1, wherein the fluid directing structure on the inner tube extends around the entire periphery of the inner tube such that a flame envelope overlies and intermixes with the pre-mixed mixture entering the fluid passage from the fluid directing structure on the outer tube.

7. The fuel burner of claim 1, wherein the pre-mixed mixture is radially layered within the fluid passage.

8. The fuel burner of claim 1, wherein the fuel burner produces about 10 ppm of total $NO_x$ at about 10% $CO_2$.

9. A heating appliance including the fuel burner of claim 1.

10. The fuel burner of claim 1 further comprising a housing defining an interior for receiving the inner tube and the outer tube, the a plate securing the second end of the outer tube to the housing in a fluid-tight manner.

* * * * *